(12) United States Patent
Kim et al.

(10) Patent No.: US 10,529,091 B2
(45) Date of Patent: Jan. 7, 2020

(54) CALIBRATION METHOD AND APPARATUS

(71) Applicants: HYUNDAI MOBIS CO., LTD., Seoul (KR); KOREA NATIONAL UNIVERSITY OF TRANSPORTATION INDUSTRY-ACADEMIC COOPERATION FOUNDATION, Chungju-si, Chungcheongbuk-do (KR)

(72) Inventors: Hoon Min Kim, Anyang-si (KR); Dong Wook Jung, Seoul (KR); Sung Joo Lee, Seoul (KR); Kyoungtaek Choi, Hwaseong-si (KR); Jae Kyu Suhr, Incheon (KR); Ho Gi Jung, Seoul (KR)

(73) Assignees: Hyundai Mobis Co., Ltd., Seoul (KR); Korea National University Of Transportation Industry-Academic Cooperation Foundation, Chungju-si, Chungcheonbuk-do (KR)

( * ) Notice: Subject to any disclaimer, the term of this patent is extended or adjusted under 35 U.S.C. 154(b) by 0 days.

(21) Appl. No.: 16/008,933

(22) Filed: Jun. 14, 2018

(65) Prior Publication Data

US 2018/0365858 A1    Dec. 20, 2018

(30) Foreign Application Priority Data

Jun. 14, 2017  (KR) .................. 10-2017-0074556
Oct. 12, 2017  (KR) .................. 10-2017-0132250

(51) Int. Cl.
*G06T 7/80*    (2017.01)
*B60R 11/04*   (2006.01)
(Continued)

(52) U.S. Cl.
CPC .............. *G06T 7/80* (2017.01); *B60R 11/04* (2013.01); *G06T 7/536* (2017.01); *G06T 7/74* (2017.01);
(Continued)

(58) Field of Classification Search
None
See application file for complete search history.

(56) References Cited

U.S. PATENT DOCUMENTS

| 8,928,757 | B2 * | 1/2015 | Maekawa | ............ H04N 17/002 348/148 |
| 2012/0281881 | A1 * | 11/2012 | Walter | .................... B60T 8/172 382/104 |

(Continued)

FOREIGN PATENT DOCUMENTS

| JP | 2007-333679 A | 12/2007 |
| JP | 2011-073529 A | 4/2011 |

(Continued)

*Primary Examiner* — Fernando Alcon
(74) *Attorney, Agent, or Firm* — Knobbe Martens Olson & Bear LLP

(57) ABSTRACT

A calibration method may include: detecting, by a lane detection unit, lanes from around images acquired through cameras of a vehicle, when a behavior of the vehicle satisfies a preset behavior condition; analyzing, by a valid lane extraction unit, statistical characteristics of the positions and directions of the detected lanes, and extracting a valid lane by removing a misdetected lane; and estimating, by a parameter estimation unit, installation angles of the cameras based on the direction of the valid lane and a vanishing point decided through the valid lane.

27 Claims, 14 Drawing Sheets

(51) Int. Cl.
*G06T 7/77* (2017.01)
*G06T 7/73* (2017.01)
*G06T 7/536* (2017.01)
*H04N 7/18* (2006.01)
*G08G 1/16* (2006.01)

(52) U.S. Cl.
CPC ............... *G06T 7/77* (2017.01); *H04N 7/181* (2013.01); *G06T 2207/30252* (2013.01); *G06T 2207/30256* (2013.01); *G08G 1/167* (2013.01)

(56) References Cited

U.S. PATENT DOCUMENTS

2012/0314073 A1* 12/2012 Shimoda .................. G06T 7/80
   348/148
2018/0053330 A1* 2/2018 Lee ............................ B60R 1/00
2019/0095723 A1* 3/2019 Tsuchiya .................... G06T 7/60

FOREIGN PATENT DOCUMENTS

| KR | 10-2011-0055421 A | 5/2011 | |
|---|---|---|---|
| KR | 10-2015-0112656 A | 10/2015 | |
| WO | WO-2016153100 A1 * | 9/2016 | ............... G06T 3/00 |

\* cited by examiner

Front camera

Rear camera

Left camera

Right camera

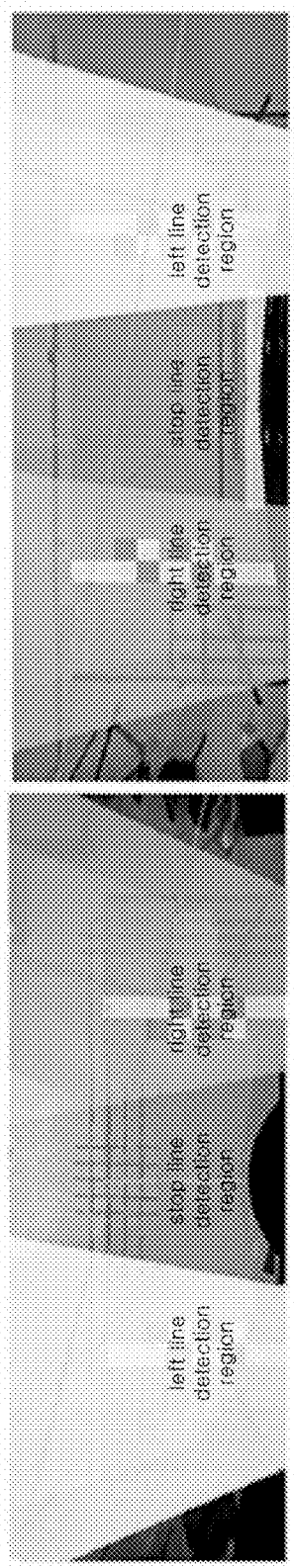
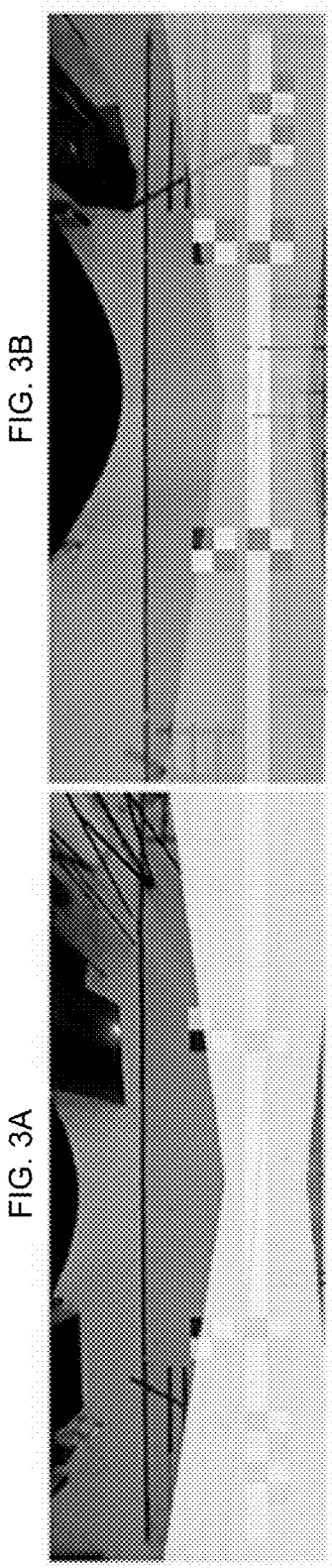
FIG. 3A Front camera
FIG. 3B Rear camera
FIG. 3C Left camera
FIG. 3D Right camera Median filter applied Median filter not applied

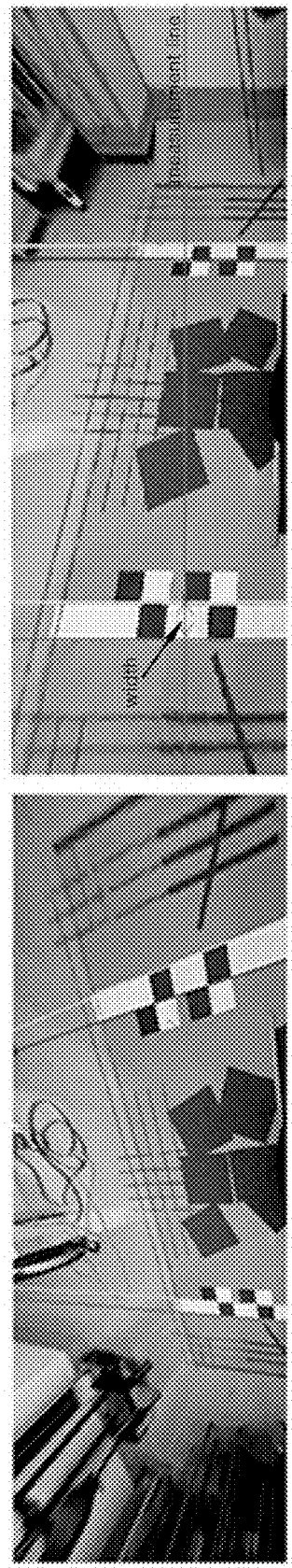
FIG. 6B After pitch and yaw are estimated
FIG. 6A Before pitch and yaw are estimated

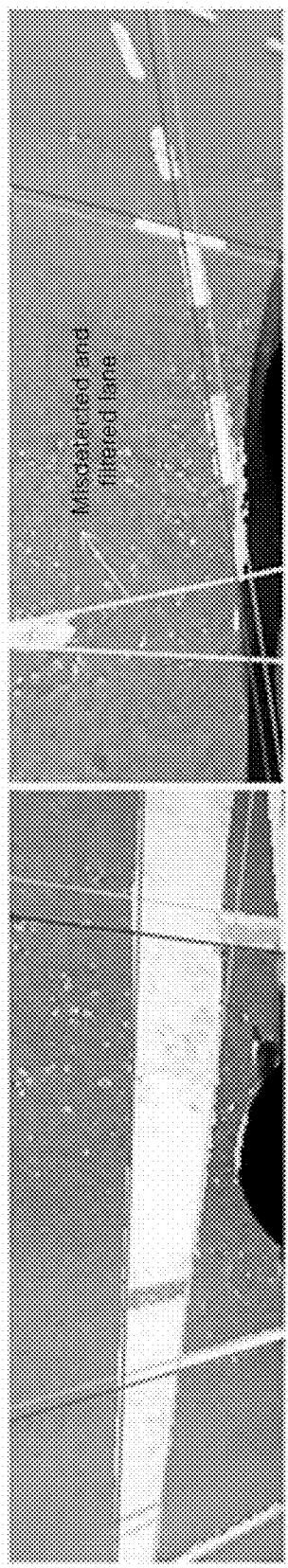

CALIBRATION METHOD AND APPARATUS

CROSS-REFERENCES TO RELATED APPLICATIONS

The present application claims priorities to Korean Application No. 10-2017-0074556, filed on Jun. 14, 2017 and Korean Application No. 10-2017-0132250, filed on Oct. 12, 2017, which are incorporated by references in their entirety.

BACKGROUND OF THE INVENTION

The present invention relates to a calibration method and apparatus, and more particularly, to a calibration method and apparatus which are capable of estimating installation angles of cameras mounted on a vehicle based on lanes.

An around view monitoring (AVM) system refers to a system that combines around images acquired from front, rear, left and right cameras of a vehicle into one image and provides the image such that a driver can recognize the surrounding situations. The AVM system has been spread as a driving support system for assisting a driver by providing a convenience to the driver. For example, the AVM system may provide a blind spot image of the vehicle or a rear view image of the vehicle during parking.

In order to combine images acquired from the plurality of cameras mounted in the vehicle into one image, internal parameters and external parameters of the cameras must be provided. The internal parameter may include an optical center and focal distance, and the external parameter may include an installation position and installation angle. Since the internal parameters are constant, values acquired through calibration can be continuously utilized as the internal parameters. However, since the external parameters can be easily changed by an external shock, the external parameters need to be continuously calibrated. Among the external parameters, the installation position is not significantly changed due to an installation jig, even though a camera is replaced. However, the installation angle is sensitive to an influence of disturbance, and an error of the installation angle may cause a problem that images acquired from the respective cameras are not combined.

In the related art, a skilled worker has performed calibration on cameras using a separate device in a calibration site having a specific calibration pattern drawn on the ground. Such a method can provide an accurate result because the worker can accurately know the relative position of a specific marker on the calibration pattern in advance. However, the method has a spatial limit in that a space having a predetermined area or more is required. For example, the space may be installed in a factory from which vehicles are shipped. Furthermore, since the method is performed by a skilled worker using a separate device, the time and cost of a driver are inevitably consumed. Therefore, there is a demand for a system capable of improving the convenience of a calibration operation.

The related art is disclosed in Korean Patent Publication No. 10-2011-0055421 published on May 25, 2011.

SUMMARY OF THE INVENTION

Embodiments of the present invention are directed to a calibration method and apparatus capable of removing inconvenience of a conventional calibration operation which has been performed by a skilled worker through external equipment in a calibration site having a specific calibration pattern drawn thereon, thereby improving the practicality and convenience of a calibration operation.

In one embodiment, a calibration method may include: detecting, by a lane detection unit, lanes from around images acquired through cameras of a vehicle, when a behavior of the vehicle satisfies a preset behavior condition; analyzing, by a valid lane extraction unit, statistical characteristics of the positions and directions of the detected lanes, and extracting a valid lane by removing a misdetected lane; and estimating, by a parameter estimation unit, installation angles of the cameras based on the direction of the valid lane and a vanishing point decided through the valid lane.

The behavior condition may include one or more of a vehicle speed condition that a vehicle speed is equal to or more than a preset vehicle speed and a steering angle condition that a steering angle is equal to or more than a preset steering angle.

The detecting of the lanes may include: detecting, by the lane detection unit, straight lines based on edge components extracted from the around images; and detecting, by the lane detection unit, the lanes by determining lane fits of straight lines present in a preset lane detection region among the detected straight lines.

The detecting of the straight lines may include: calculating, by the lane detection unit, gradients in a bird's-eye view generated from the around images, and extracting the edge components based on the directions and magnitudes of the calculated gradients; and detecting, by the lane detection unit, one or more straight line pairs, each of which includes a straight line for an edge component having a gradient in the increasing direction of pixel value and a straight line for an edge component having a gradient in the decreasing direction of pixel value, among the extracted edge components.

In the detecting of the lanes by determining the lane fits, the lane detection unit may determine that the lane fit is satisfied, when one or more of a crossing condition that two straight lines included in the straight line pair do not cross each other, a lane thickness condition that the minimum distance and maximum distance between the two straight lines included in the straight line pair fall within a preset lane thickness change range, and an overlap ratio condition that the overlap ratio of the two straight lines included in the straight line pair when the two straight lines are projected onto a reference axis on the bird's-eye view is equal to or more than a preset ratio are satisfied.

The extracting of the valid lane may include: projecting, by the valid lane extraction unit, the positions of the detected lanes onto a reference axis on a bird's-eye view generated through the around images, generating a histogram by accumulating a predetermined number of frames or more, determining a lane as a misdetected lane, the lane being a preset distance or more away from a reference lane position decided according to the generated histogram, and removing the misdetected lane; and calculating, by the valid lane extraction unit, installation angles of the cameras using a vanishing point estimated through the detected lanes, deciding calculated lanes by calibrating angle errors of the detected lanes based on the calculated installation angles, deciding a misdetected lane based on parallelisms between the decided calibrated lanes and the reference axis on the bird's-eye view, and removing the misdetected lane.

The cameras may include front, rear, left and right cameras, and the installation angles may include a pitch, yaw and roll. In the estimating of the installation angles of the cameras, the parameter estimation unit may estimate 12 installation angles including pitches, yaws and rolls of the front, rear, left and right cameras.

The estimating of the installation angles of the cameras may include: estimating, by the parameter estimation unit, the pitches, yaws and rolls of the front and rear cameras based on the directions of front/rear valid lanes and a vanishing point decided through the front/rear valid lanes, wherein the front/rear valid lanes are valid lanes on a bird's-eye view generated through the around images of the front and rear cameras; estimating, by the parameter estimation unit, the yaws and rolls of the left and right cameras based on the directions of left/right valid lanes and a vanishing point decided through the left/right valid lanes, wherein the left/right valid lanes are valid lanes on a bird's-eye view generated through the around images of the left and right cameras; and projecting, by the parameter estimation unit, the front/rear valid lanes and the left/right valid lanes onto a common coordinate system, and estimating the pitches of the left and right cameras such that the same lanes are matched with each other.

The estimating of the pitches, yaws and rolls of the front and rear cameras may include: converting, by the parameter estimation unit, the front/rear valid lanes into calibrated straight lines on a coordinate system of which lens distortion is calibrated; estimating, by the parameter estimation unit, the pitches and yaws of the front and rear cameras based on the relation between a vanishing point decided through the calibrated straight lines and a preset first reference vanishing point; reestimating, by the parameter estimation unit, the pitches and yaws of the front and rear cameras within a preset angle range through the Levenberg-Marquardt (LM), using the initially estimated pitches and yaws of the front and rear cameras as the initial values; and initially estimating, by the parameter estimation unit, the rolls of the front and rear cameras, such that a difference between the widths of left and right lanes included in the front/rear valid lanes in the bird's-eye view, calibrated according to the reestimated pitches and yaws of the front and rear cameras, is minimized.

In the reestimating of the pitches and yaws of the front and rear cameras through the LM, the parameter estimation unit may convert the calibrated straight lines into front/rear valid lanes on the bird's-eye view, using a rotation matrix of the front and rear cameras which is calculated during the reestimation process through the LM, and reestimate the pitches and yaws of the front and rear cameras such that the front/rear valid lanes are parallel to a first-direction reference axis on the bird's-eye view, and parallel to each other.

The estimating of the pitches, yaws and rolls of the front and rear cameras may further include extracting, by the parameter estimation unit, a stop line from lanes which are not parallel to a traveling direction of the vehicle, when the lanes which are not parallel to the traveling direction of the vehicle are detected by a preset number or more, and reestimating the initially estimated rolls of the front and rear cameras within a preset angle range through the LM, based on a parallelism between two straight lines included in the extracted stop line.

The estimating of the yaws and rolls of the left and right cameras may include: converting, by the parameter estimation unit, the left/right valid lanes into calibrated straight lines on the coordinate system of which lens distortion is calibrated; initially estimating, by the parameter estimation unit, the yaws and rolls of the left and right cameras based on the relation between a vanishing point decided through the calibrated straight lines and a preset second reference vanishing point; and reestimating, by the parameter estimation unit, the yaws and rolls of the left and right cameras within a preset angle range through the LM, using the initially estimated yaws and rolls of the left and right cameras as the initial values.

The calibration method may further include precisely estimating, by the parameter estimation unit, 12 installation angles including the pitches, yaws and rolls estimated for the front, rear, left and right cameras through the LM.

The calibration method may further include accumulating, by a parameter selection unit, 12 installation angles including the pitches, yaws and rolls estimated for the front, rear, left and right cameras as 12-dimensional vectors, and selecting a vector having the minimum average Euclidean distance among the accumulated 12-dimensional vectors as the final installation angle of the front, rear, left and right cameras, when the number of accumulated 12-dimensional vectors is equal to or more than a preset value.

In another embodiment, a calibration apparatus may include: a lane detection unit configured to detect lanes from around images acquired through cameras of a vehicle, when a behavior of the vehicle satisfies a preset behavior condition; a valid lane extraction unit configured to analyze statistical characteristics of the positions and directions of the detected lanes, and extract a valid lane by removing a misdetected lane; and a parameter estimation unit configured to estimate installation angles of the cameras based on the direction of the valid lane and a vanishing point decided through the valid lane.

BRIEF DESCRIPTION OF THE DRAWINGS

FIGS. 3A to 3D show lane detection regions of a region of interest (ROI) in bird's-eye views of the front, rear, left and right cameras in the calibration apparatus in accordance with the embodiment of the present invention.

FIGS. 6A and 6B are bird's-eye views before and after pitches and yaws of the front and rear cameras are calibrated in the calibration apparatus in accordance with the embodiment of the present invention.

FIGS. 7A and 7B show a process of extracting a stop line in the calibration apparatus in accordance with the embodiment of the present invention.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

First, an operation of a calibration apparatus in accordance with an embodiment of the present invention will be described.

In the present embodiment, a lane detection unit may detect lanes from a plurality of images acquired through front, rear, left and right cameras in real time, when a vehicle travels on the road, the lanes including road marking lines and stop lines. The detected lanes may be stored in a queue-type data structure. When the number of stored lanes is equal to or more than a predetermined value, a misdetected lane may be removed by a valid lane extraction unit. That is, when the vehicle travels along a road marking line, the position and direction of the lane may not be significantly changed for a predetermined time. Therefore, the valid lane extraction unit may remove misdetected lanes by analyzing the statistical characteristics of the positions and directions of the detected lanes, thereby extracting valid lanes. A parameter estimation unit may estimate 12 camera installation angles including the pitches, yaws and rolls of the front, rear, left and right cameras, based on the directions of the valid lanes and a vanishing point decided by the valid lanes. Then, a parameter selection unit may accumulate the 12 camera installation angles as 12-dimensional vectors, select the optimal 12-dimensional vector among the 12-dimensional vectors, and set the selected vector to the final camera installation angle.

Hereafter, based on the above-described configuration, the calibration apparatus in accordance with the embodiment of the present invention will be described in detail.

Figure 1:
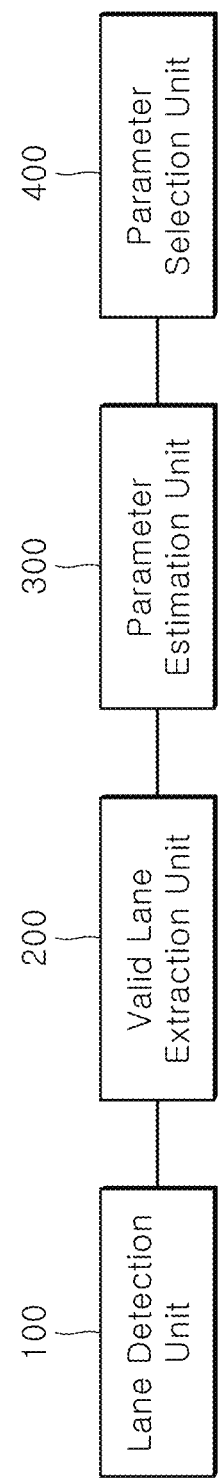
FIG. 1 is a block diagram illustrating a calibration apparatus in accordance with an embodiment of the present invention.
Figure 2A:
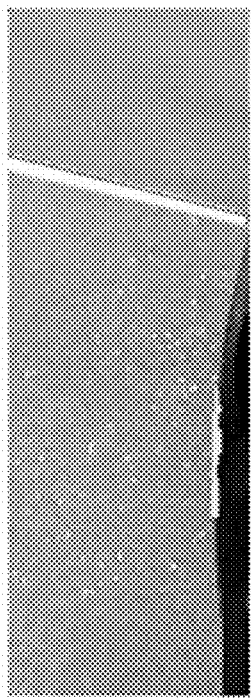
FIGS. 2A to 2D are bird's-eye views when the installation angles of front, rear, left and right cameras have an error of 5° in the calibration apparatus in accordance with the embodiment of the present invention.
Figure 2B:
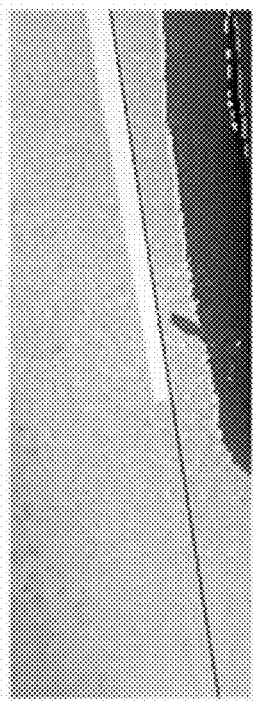
Figure 2C:
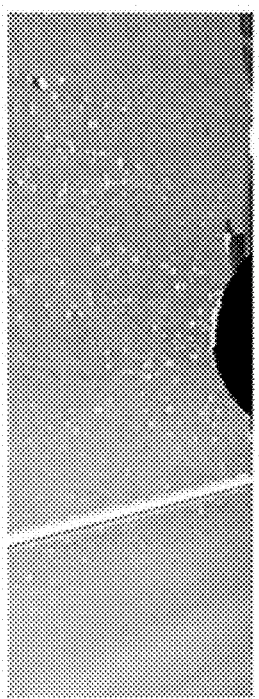
Figure 2D:
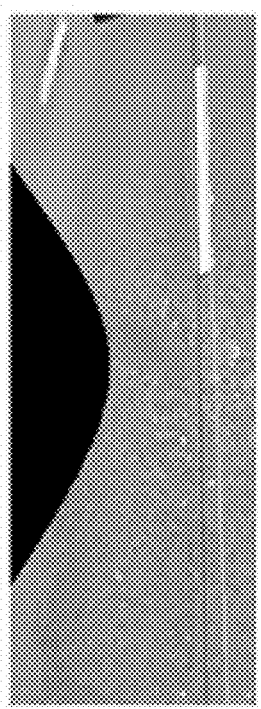
Figure 4B:
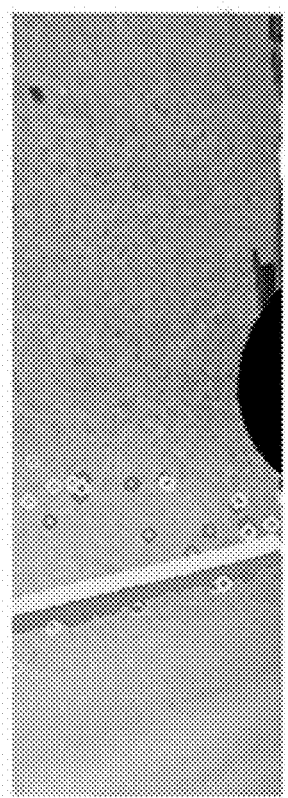
FIGS. 4A and 4B show results obtained by performing an image pre-processing operation on a bird's-eye view image using a median filter in the calibration apparatus in accordance with the embodiment of the present invention.
Figure 4A:
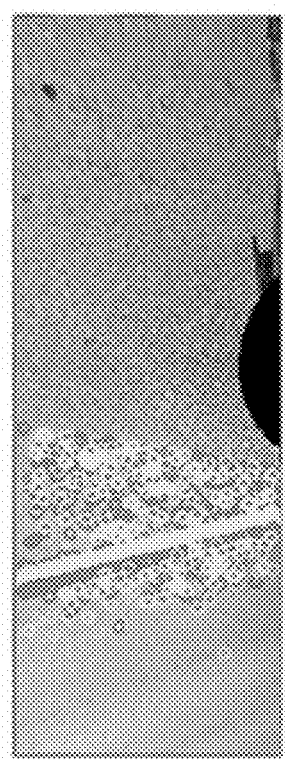
Figure 5A:
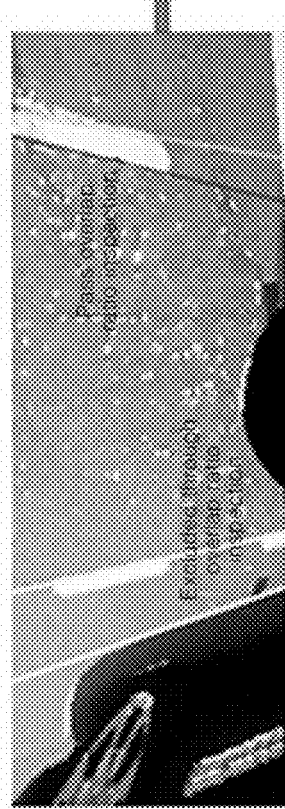
FIGS. 5A and 5B show a process of determining a lane fit depending on an overlap ratio condition in the calibration apparatus in accordance with the embodiment of the present invention.
Figure 5B:
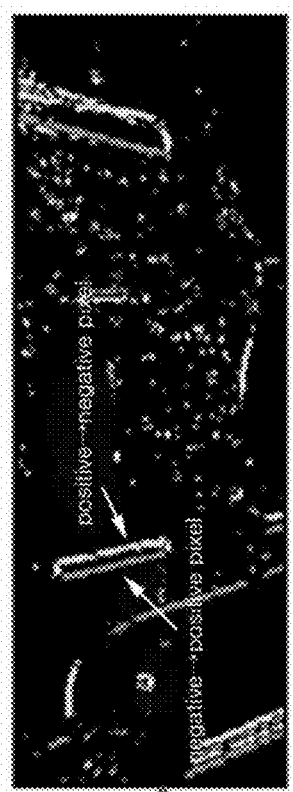
Figure 8:
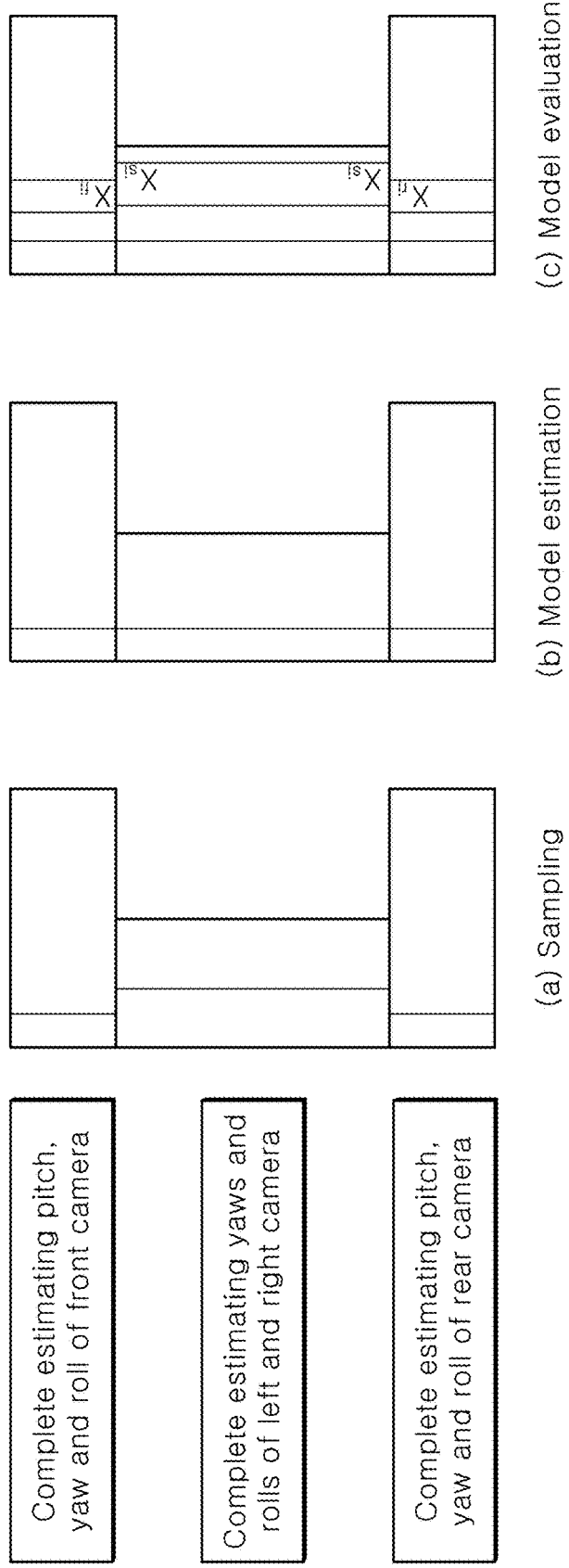
FIG. 8 illustrates a process of estimating pitches of the left and right cameras in the calibration apparatus in accordance with the embodiment of the present invention.

FIG. 1 is a block diagram illustrating a calibration apparatus in accordance with an embodiment of the present invention, FIGS. 2A to 2D are bird's-eye views when the installation angles of front, rear, left and right cameras have an error of 5° in the calibration apparatus in accordance with the embodiment of the present invention, FIGS. 3A to 3D show lane detection regions of a region of interest (ROI) in bird's-eye views of the front, rear, left and right cameras in the calibration apparatus in accordance with the embodiment of the present invention, FIGS. 4A and 4B show results obtained by performing an image pre-processing operation on a bird's-eye view image using a median filter in the calibration apparatus in accordance with the embodiment of the present invention, FIGS. 5A and 5B show a process of determining a lane fit depending on an overlap ratio condition in the calibration apparatus in accordance with the embodiment of the present invention, FIGS. 6A and 6B are bird's-eye views before and after pitches and yaws of the front and rear cameras are calibrated in the calibration apparatus in accordance with the embodiment of the present invention, FIGS. 7A and 7B show a process of extracting a stop line in the calibration apparatus in accordance with the embodiment of the present invention, and FIG. 8 illustrates a process of estimating pitches of the left and right cameras in the calibration apparatus in accordance with the embodiment of the present invention.

Referring to FIG. 1, the calibration apparatus in accordance with the embodiment of the present invention may include a lane detection unit 100, a valid lane extraction unit 200, a parameter estimation unit 300 and a parameter selection unit 400.

The lane detection unit 100 may detect lanes from around images acquired from cameras of a vehicle, when a behavior of the vehicle satisfies a preset behavior condition. The behavior condition may include one or more of a vehicle speed condition for determining whether a vehicle speed is equal to or more than a preset vehicle speed and a steering angle condition for determining whether a steering angle is equal to or less than a preset steering angle.

Specifically, in the present embodiment, the cameras may be calibrated based on the lanes detected through the lane detection unit 100. Thus, since the accuracy of the lane detection is directly connected with the calibration precision of the cameras, it is important to accurately detect the lanes. When the vehicle is stopped for a while, the lane detection unit 100 may detect only the same lane, which makes it possible to defect a calibration result. At this time, when the lane is misdetected, the misdetected lane cannot be removed even though the statistical characteristics of the position and direction of the lane are analyzed as described later. In this case, a calibration error may further increase. Therefore, when the vehicle speed condition is satisfied or the vehicle speed is equal to or more than the preset vehicle speed, the lane detection unit 100 may determine that the vehicle is traveling, and then detect lanes.

When the vehicle makes a U-turn, the lane detection unit 100 cannot accurately detect lanes. Therefore, the lane detection unit 100 can detect lanes when the steering angle condition is satisfied or the steering angle is equal to or more than the preset steering angle.

In the present embodiment, the lane detection unit 100 may detect a road marking line and a stop line. When both of the vehicle speed condition and the steering angle condition are satisfied for a predetermined time (for example, three seconds), it may indicate that the vehicle is traveling along a lane. Thus, the lane detection unit 100 may detect a road marking line. When the steering angle condition is satisfied but the vehicle speed condition is not satisfied, the lane detection unit 100 may not detect the road marking line, but detect only the stop line, in order to prevent a deflection during calibration.

When a behavior of the vehicle satisfies the behavior condition, the lane detection unit 100 may detect lanes from the around images acquired from the cameras of the vehicle. The lane detection may be performed at a bird's-eye view which is less influenced by perspective distortion and lens distortion such as radial distortion, and low-resolution images (for example, 300*125) may be used for high-speed processing. FIGS. 2A to 2D are bird's-eye views when the installation angles of the front, right, left and right cameras have an error of 5°. Hereafter, the process in which the lane detection unit 100 detects lanes will be described in detail.

First, a region of interest (ROI) may be set in the lane detection unit 100 in advance, the ROI including a lane detection region, a lane angle change range and a lane thickness change range.

Specifically, when the vehicle travels along a road, a road marking line may be parallel to the y-axis in bird's-eye views generated from around images of the front and rear cameras, and parallel to the x-axis in bird's-eye views generated from around images of the left and right cameras. Therefore, when an installation angle error range (for example, −5° to +5°) of each of the cameras is provided in advance, a region in which a lane may be present in the bird's-eye view, an angle change range of the lane in the bird's-eye view, and a thickness change range of the lane in the bird's-eye view in case of an installation angle error may be obtained through a predetermined simulation, and an ROI obtained through the simulation may be set in the lane detection unit 100 in advance. As described later, the lane detection unit 100 may detect a lane based on the lane detection region of the ROI, the lane angle change range may be utilized when edge components are extracted, and the lane thickness change range may be utilized when a lane fit is determined. The lane detection region may be divided into a left lane detection region, a right lane detection region and a stop line detection region, and FIGS. 3A to 3D show lane detection regions in the bird's-eye views of the front, rear, left and right cameras.

Based on the above-described ROI, the lane detection unit 100 may detect straight lines using edge components extracted from the around images of the cameras, and determine the lane fit of a straight line present in the lane detection region of the ROI among the detected straight lines, thereby detecting a lane.

First, the process in which the lane detection unit 100 detects straight lines based on edge components will be described in detail.

The lane detection unit 100 may generate a look-up table for converting around images acquired from the cameras into a bird's-eye view, using the initial installation angles of the respective cameras, and generate a bird's-eye view using the look-up table. The lane detection unit 100 may calculate gradients in the generated bird's-eye view, and extract edge components based on the directions and magnitudes of the calculated gradients.

Specifically, the lane detection unit 100 may extract points at which angles between the reference axis (x- or y-axis) of the bird's-eye view and the directions of the gradients calculated in the bird's-eye view fall within the lane angle change range of the ROI, and the magnitudes of the gradients are equal to or more than a preset threshold value of 75, for example, as the edge components. In the case of a road marking line, the reference axis which is the comparison target with the directions of the gradients may be set to the y-axis in the bird's-eye views of the front and rear cameras or the x-axis in the bird's-eye views of the left and right cameras. In the case of a stop line, the reference axis may be set to the x-axis in the bird's-eye views of the front and rear cameras.

At this time, in order to preserve available edge components while removing noise such as wrong edge components, the lane detection unit 100 may perform image pre-processing through a median filter (for example, 3*3 size), before the calculating of the gradients. Therefore, as illustrated in FIGS. 4A and 4B, the lane detection unit 100 can minimize wrong edge components, thereby improving the lane detection precision while reducing a computation amount.

After the edge components are extracted, the lane detection unit 100 may detect one or more straight line pairs, each of which includes a straight line for an edge component having a gradient in the increasing direction of pixel value and a straight line for an edge component having a gradient in the decreasing direction of pixel value. The straight line pair may indicate a pair of two straight lines included in one lane as illustrated in FIG. 2. That is, the road marking line may include a pair of left and right straight lines, and the stop line may include a pair of upper and lower straight lines. The lines for the edge components may be detected through the random sample consensus (RANSAC) algorithm. When the RANSAC algorithm is performed, the lane detection unit 100 may detect only lines each having inliers of which the number is equal to or more than a preset value.

On the left of the vehicle, a double lane (for example, center line) may be present. Therefore, the lane detection unit 100 may detect a straight line pair in the left lane detection region of the ROI through the above-described process, detect an additional straight line pair through the RANSAN algorithm, and select the straight line pair which is the closest to the vehicle. In the road transport system following the left hand traffic, the lane detection unit 100 may perform the above-described process on the right lane detection region.

Next, the process of detecting a lane from the detected straight lines will be described in detail.

The lane detection unit 100 may decide a straight line which is present in the lane detection region of the ROI, among the straight lines detected through the above-described process, and determine the lane fit of the decided straight line, in order to detect a lane. The lane fit may include one or more of a crossing condition, a lane thickness condition and an overlap ratio condition.

Specifically, since two straight lines included in the above-described straight line pair is a pair of two straight lines included in one lane, the two straight lines cannot cross each other. Therefore, the lane detection unit 100 may determine whether the crossing condition is satisfied or the two straight lines do not cross each other. Furthermore, the lane detection unit 100 may determine whether the lane thickness condition is satisfied or the minimum distance and maximum distance between the two straight lines included in the straight line pair fall within the lane thickness change range of the ROI. Moreover, the lane detection unit 100 may determine whether the overlap ratio condition is satisfied or an overlap ratio of the two straight lines included in the straight line pair is equal to or more than a preset ratio when the two straight lines are projected onto the reference axis (x-axis or y-axis) of the bird's-eye view. In the preset embodiment, the overlap ratio may indicate how much the two straight lines overlap each other when the two straight lines are projected onto the reference axis of the bird's-eye view.

The overlap ratio will be described in more detail as follows. When two straight lines are not detected from the same lane as illustrated in FIGS. 5A and 5B, the overlap ratio may decrease when an edge component having a gradient in the increasing direction of pixel value and an edge component having a gradient in the decreasing direction of pixel value, which were used to detect the straight lines, are projected onto the reference axis. The reference axis may be set to the y-axis in the bird's-eye views of the front and rear cameras and the x-axis in the bird's-eye views of the left and right cameras, in the case of a road marking line. Furthermore, the reference axis may be set to the x-axis in the bird's-eye views of the front and rear cameras, in the case of a stop line. In other words, when the two straights are included in the same lane, the overlap ratio is high. Therefore, when the overlap ratio is equal to or more than the preset ratio, the lane detection unit 100 may determine that the two straight lines are included in the same lane, and detect the lane. The overlap ratio may be calculated according to Equation 1 below.

$$O_r = \frac{M_c(A \cap B)}{A \cup B}$$ [Equation 1]

In Equation 1, $O_r$ represents the overlap ratio, A represents the group of edge components which are projected onto the reference axis and have a gradient in the increasing direction of pixel value, and B represents the group of edge components which are projected onto the reference axis and have a gradient in the decreasing direction of pixel value. Furthermore, $M_c$ represents a one-dimensional closing morphological operator for the reference axis onto which the edge components are projected. When the overlap ratio is utilized to determine the lane fit, a straight line detected from shadow or another vehicle can be effectively excluded as illustrated in FIGS. 5A and 5B.

The lane detection unit 100 may detect a lane may determining whether one or more of the crossing condition, the lane thickness condition and the overlap ratio condition are satisfied. However, in order to more precisely detect a lane, the lane detection unit 100 may detect a straight line as a lane, the straight line satisfying all of the three conditions.

When the lanes are detected by the lane detection unit 100, the valid lane extraction unit 200 may analyze the statistical characteristics of the positions and directions of the detected lanes, and remove a misdetected lane, thereby extracting a valid lane.

Specifically, since a misdetected lane is inevitably present in the lanes detected by the lane detection unit 100, the misdetected lane needs to be removed. In the environment where the vehicle travels along the road as described above, the changes in position and direction of the lanes detected by the lane detection unit 100 may be limited. Furthermore, when most of the detected lanes are lanes of a traveling road, the position and direction characteristics of the lanes may form a group. Therefore, the valid lane extraction unit 200 can analyze the statistical characteristics of the positions and directions of the lanes, and remove an error out of the group, that is, a misdetected lane.

For this operation, the valid lane extraction unit 200 may project the positions of the lanes detected by the lane detection unit 100 onto the reference axis of the bird's-eye view, generate a histogram by accumulating a predetermined number of frames or more, and determine a lane as a misdetected lane, the lane being a preset distance or more away from a reference lane position which is decided according to the generated histogram. Then, the valid lane extraction unit 200 may remove the misdetected lane. That is, the lane detection unit 100 may analyze the statistical characteristics of the lane positions, in order to remove the misdetected lane.

Specifically, in the case of road marking lines acquired from images of the front and rear cameras, changes of x-axis positions (x coordinates) at a specific position on the bird's-eye view (for example, the bottom of the bird's-eye view) may be limited. Therefore, the lane detection unit 100 may project the x-axis positions of the road marking lines onto the y-axis, generate a histogram by accumulating a predetermined number of frames or more, decide the reference lane position based on the generated histogram, determine a road marking line which is a preset distance or more away from the reference lane position, as a misdetected lane, and remove the misdetected lane.

Similarly, in the case of road marking lines acquired from the images of the left and right cameras, changes of y-axis positions (y coordinates) at a specific position on the bird's-eye view (for example, the center of the bird's-eye view) may be limited. Therefore, the lane detection unit 100 may project the y-axis positions of the road marking lines onto the x-axis, generate a histogram by accumulating a predetermined number of frames or more, decide the reference lane position based on the generated histogram, determine a road marking line which is a preset distance or more away from the reference lane position, as a misdetected lane, and remove the misdetected lane.

When the generated histogram is a uni-modal histogram, the reference lane position may be decided by a peak value. When the generated histogram is a multi-modal histogram, the reference lane position may be decided by a mode which is the closest to the vehicle.

Then, the valid lane extraction unit 200 may calculate the installation angles of the cameras using a vanishing point estimated through the detected lanes, decide a calibrated lane by calibrating angle errors of the detected lanes based on the calculated installation angles, decide a misdetected lane based on a parallelism between the decided calibrated lane and the reference axis on the bird's-eye view, and remove the misdetected lane. That is, the valid lane extraction unit 200 may analyze the statistical characteristics of the lane directions, in order to remove the misdetected lane.

Specifically, in the case of the front and rear cameras, the valid lane extraction unit 200 may calculate a vanishing point using a pair of left and right lanes detected by the lane detection unit 100, accumulate the positions of vanishing points as a histogram, and estimate the final vanishing point using the average of vanishing points belonging to the largest bin. The valid lane extraction unit 200 may calculate pitches and yaws of the front and rear cameras using the estimated final vanishing point, and decide calibrated lanes by calibrating angle errors of the lanes detected by the lane detection unit 100 based on the calculated installation angles (that is, pitches and yaws). Since the method for calculating a pitch and yaw using a vanishing point is publicly known in the same technical field, the detailed descriptions thereof are omitted herein. Since the decided calibrated lanes need to be parallel to the y-axis in the bird's-eye view, the valid lane extraction unit 200 may decide a misdetected lane based on the parallelisms between the calibrated lanes and the reference axis (y-axis) on the bird's-eye view, and remove the misdetected lane. The parallelism between a calibrated lane and the reference axis (y-axis) may be calculated as the absolute value of a difference between the x-coordinates of both end points of the calibrated lane on the bird's-eye view. When the calculated value is equal to or more than a threshold value, the valid lane extraction unit 200 may determine the corresponding lane as a misdetected lane, and remove the misdetected lane.

Since the left and right cameras acquire a smaller amount of data than the front and rear cameras, the valid lane extraction unit 200 may sample a specific frame among a plurality of frames, and estimate a vanishing point using two straight lines detected from the corresponding frame. The valid lane extraction unit 200 may calculate yaws and rolls of the left and right cameras using the estimated vanishing point, and decide calibrated lanes by calibrating angle errors of the detected lanes based on the calculated installation angles (that is, the yaws and rolls). Since the decided calibrated lanes need to be parallel to the x-axis on the bird's-eye view, the valid lane extraction unit 200 may decide a misdetected lane based on the parallelisms between the calibrated lanes and the reference axis (x-axis) on the bird's-eye view, and remove the misdetected lane. The parallelism between a calibrated lane and the reference axis (x-axis) may be calculated as the absolute value of a difference between the y-coordinates of both end points of the calibrated lane on the bird's-eye view. When the calculated value is equal to or more than a threshold value, the valid lane extraction unit 200 may determine the corresponding lane as a misdetected lane, and remove the misdetected lane.

When the valid lane extraction unit 200 extracts valid lanes by removing the misdetected lane, the parameter estimation unit 300 may estimate the installation angles of the cameras based on the directions of the valid lanes and a vanishing point decided through the valid lanes. At this time, the parameter estimation unit 300 may estimate 12 installation angles including pitches, yaws and rolls of the front, rear, left and right cameras.

For convenience of descriptions, the terms may be clearly defined.

A front/rear valid lane may be defined as a valid lane on a bird's-eye view generated from around images of the front and rear cameras, and a left/right valid lane may be defined as a valid lane on a bird's-eye view generated from around images of the left and right cameras.

Only when the number of valid lanes extracted by the valid lane extraction unit 200 is equal to or more than a preset value before the installation angles of the cameras are estimated, the parameter estimation unit 300 may estimate the installation angles of the cameras, thereby securing the reliability of the installation angle estimation. Furthermore, only when the numbers of front/rear valid lanes and left/right valid lanes which are detected at the same point of time are equal to or more than a preset value, the parameter estimation unit 300 may estimate the installation angles of the cameras, thereby securing the reliability of the operation of estimating the pitches of the left and right cameras.

The process in which the parameter estimation unit 300 estimates the installation angles of the cameras may be divided into a process of estimating pitches, yaws and rolls of the front and rear cameras, a process of estimating yaws and rolls of the left and right cameras, and a process of estimating pitches of the left and right cameras.

First, the process in which the parameter estimation unit 300 estimates the pitches, yaws and rolls of the front and rear cameras will be described in detail.

The parameter estimation unit 300 may estimate the pitches, yaws and rolls of the front and rear cameras based on the directions of the front/rear valid lanes and a vanishing point decided through the front/rear valid lanes.

Specifically, the parameter estimation unit 300 may convert the front/rear valid lanes into calibrated straight lines on a coordinate system of which lens distortion is calibrated. The lens distortion may include radial distortion of a fisheye lens. The front/rear valid lanes may be converted into the calibrated straight lines according to Equation 2 below.

$$L_{uv} = (K_b \times R_o \times K^{-1})^{-T} \times L_{bv} \qquad \text{[Equation 2]}$$

In Equation 2, $L_{uv}$ represents a calibrated straight line on the coordinate system of which lens distortion is calibrated, $K_b$ represents an internal parameter matrix of a bird's-eye view, $R_o$ represents a camera rotation matrix formed by the initial installation angles of the front and rear cameras, K represents an internal parameter matrix of an image whose lens distortion is calibrated, and $L_{bv}$ represents a front/rear valid lane (that is, a straight line included in the front/rear valid lane).

When the calibrated straight lines $L_{uv} = [L_{uv1}, L_{uv2}, \ldots, L_{uvN}]$ on the coordinate system of which lens distortion is calibrated are decided, the parameter estimation unit 300 may initially estimate the pitches and yaws of the front and rear cameras based on the relation between a vanishing point of a calibrated straight line and a preset first reference vanishing point.

That is, since the vanishing point of the calibrated straight line meets a lane parallel to the traveling direction of the vehicle, the vanishing point needs to be positioned at a coordinate [0, 1, 0] in the bird's-eye view. Therefore, the parameter estimation unit 300 may calculate a rotation matrix for converting the vanishing point of the calibrated straight line into the first reference vanishing point, according to Equations 3 and 4, in order to initially estimate the pitches and yaws of the front and rear cameras.

$$R^T v_1' = \begin{bmatrix} 0 \\ 1 \\ 0 \end{bmatrix}, R = \begin{bmatrix} \cos\theta + u_x^2(1-\cos\theta) & u_x u_y(1-\cos\theta) - u_z\sin\theta & u_x u_z(1-\cos\theta) + u_y\sin\theta \\ u_x u_y(1-\cos\theta) + u_y\sin\theta & \cos\theta + u_y^2(1-\cos\theta) & u_y u_z(1-\cos\theta) - u_x\sin\theta \\ u_x u_z(1-\cos\theta) - u_y\sin\theta & u_y u_z(1-\cos\theta) + u_x\sin\theta & \cos\theta + u_z^2(1-\cos\theta) \end{bmatrix} \qquad \text{[Equation 3]}$$

$$u = v_1' \times \begin{bmatrix} 0 \\ 1 \\ 0 \end{bmatrix} = [u_x \ u_y \ u_z], \cos\theta = \frac{v_1' \cdot [0 \ 1 \ 0]}{\|v_1'\|} \qquad \text{[Equation 4]}$$

In Equations 3 and 4, $v_1'$ represents the vanishing point of the calibrated straight line, θ represents an angle between two straight lines connecting the origin [0, 0, 0] to the vanishing point of the calibrated straight line and the first reference vanishing point [0, 1, 0], respectively, and u represents a vector (rotation axis) perpendicular to the two straight lines, and R represents the rotation matrix. Since the roll is irrelevant to the vanishing point of the calibrated straight line, the pitches and yaws of the front and rear cameras may be initially estimated through Equations 3 and 4. Since the method for calculating the pitches and yaws through Equations 3 and 4 is publicly known, the detailed descriptions thereof are omitted herein.

When the pitches and yaws of the front and rear cameras are initially estimated, the parameter estimation unit 300 may reestimate the pitches and yaws of the front and rear cameras within a preset angle range through the Levenberg-Marquardt (LM) algorithm, using the initially estimated pitches and yaws of the front and rear cameras as the initial values. At this time, the parameter estimation unit 300 may convert the calibrated straight line into front/rear valid lanes on the bird's-eye view, using a rotation matrix of the front and rear cameras which is calculated through the reestimation process using the LM algorithm, and reestimate the pitches and yaws of the front and rear cameras such that the front/rear valid lanes are parallel to the reference axis (y-axis) in the first direction on the bird's-eye view, and parallel to each other.

Specifically, the parameter estimation unit 300 may reestimate the pitches and yaws of the front and rear cameras within the preset angle range (for example, ±1°) through the LM, using the initially estimated pitches and yaws of the front and rear cameras as the initial values. Furthermore, the parameter estimation unit 300 may convert the calibrated straight line into a straight line on the bird's-eye view according to Equation 5 below, using a camera rotation matrix calculated whenever the LM is repeated, and then calculate the cost of the LM according to Equation 6 below.

$$L'_{bv} = (K \times R_i^T \times K_b^{-1})^{-T} \times L_{uv} \qquad \text{[Equation 5]}$$

$$(P_\theta, Y_\theta) = \arg\min_{P_\theta, Y_\theta} \left\{ \sum_i^N |x_{li}(1) - x_{li}(H)| \right. \qquad \text{[Equation 6]}$$

$$\left. + \sum_j^N \sum_i^N ||x_{li}(1) - x_{lj}(1)| - |x_{li}(H) - x_{lj}(H)|| \right\}$$

In Equation 5, $R_i$ represents the camera rotation matrix which is calculated when the pitches and rolls are set to the initially estimated values and the roll is set to $R_O$, $L_{uv}$ represents the calibrated straight line, and $L_{bv}'$ represents the converted straight line on the bird's-eye view. In Equation 6, $x_{li}(y)$ represents a function for acquiring an x-coordinate for a y-coordinate value of a straight line $I_i$ in the bird's-eye view, and H represents the resolution of the vertical axis of the bird's-eye view. In Equation 6, the first term $$\left( \sum_i^N |x_{li}(1) - x_{li}(H)| \right)$$

indicates that the converted front/rear valid lanes need to be parallel to the first-direction reference axis (y-axis) on the bird's-eye view, and the second term $$\left( \sum_j^N \sum_i^N ||x_{li}(1) - x_{lj}(1)| - |x_{li}(H) - x_{lj}(H)|| \right)$$

indicates that the converted front/rear valid lanes need to be parallel to each other. Furthermore, i and j represent frame numbers.

When the pitches and yaws of the front and rear cameras are reestimated, the parameter estimation unit 300 may initially estimate the rolls of the front and rear cameras, such that a difference between the widths of left and right lanes included in the front/rear valid lanes in the bird's-eye view, is calibrated according to the reestimated pitches and yaws of the front and rear cameras, is minimized.

Specifically, when the pitches and yaws of the front and rear cameras are calibrated, the parameter estimation unit 300 can estimate the widths of the front/rear valid lanes because the front/rear valid lanes indicating road marking lines in the bird's-eye view are parallel to the y-axis as shown in FIGS. 6A and 6B. As shown in FIG. 6B, the parameter estimation unit 300 may estimate the widths of the front/rear valid lanes based on a measurement line parallel to the x-axis at the ½ position of the height of the bird's-eye view. Furthermore, the parameter estimation unit 300 may estimate rolls of the front and rear cameras, based on the supposition that the widths of the left and right lanes included in the front/rear valid lanes are equal to each other. Therefore, the parameter estimation unit 300 may estimate the rolls of the front and rear cameras through the LM, such that a difference between the widths of the left and right lanes is minimized according to Equation 7 below.

$$(R_\theta) = \arg\min_{R_\theta} \sum_i^N |W_{Li} - W_{Ri}| \qquad \text{[Equation 7]}$$

In Equation 7, $W_{Li}$ represents the width of the left lane at an i-th frame, and $W_{Ri}$ represents the width of the right lane at the i-th frame.

Before the rolls of the front and rear cameras are estimated through the above-described process, the parameter estimation unit 300 may exclude a front/rear valid line in which a ratio of the widths of the left and right lanes is significantly difference. For this operation, the parameter estimation unit 300 may select the ratio of the widths of the left and right lanes in a bird's-eye view at an arbitrary point of time as a model, and estimate the rolls of the front and rear cameras by applying Equation 7 to only left and right lanes at a different point of time, where a ratio difference from the selected model falls within a threshold value (for example, 10%).

The above-described process of estimating the rolls of the front and rear cameras did not consider a stop line. However, when a sufficient number of stop lines are detected while the vehicle travels, the parameter estimation unit 300 can estimate the rolls of the front and rear cameras with more precision, by utilizing the detected stop lines. That is, when a preset number of lanes or more which are not parallel to the traveling direction of the vehicle are detected, the parameter estimation unit 300 may extract stop lines from the lanes, and reestimate the initially estimated rolls of the front and rear cameras within a preset angle range through the LM, based on a parallelism between two straight lines included in the extracted stop lines.

For this operation, when the preset number of lanes or more which are not parallel to the traveling direction of the vehicle (that is, the y-axis direction on the bird's-eye view) are detected, the parameter estimation unit 300 may extract the stop lines by removing road marking lines through the RANSAC algorithm as illustrated in FIGS. 7A and 7B, the road marking lines being included in the lanes which are not parallel to the traveling direction of the vehicle. FIG. 7A shows an extracted stop line, and FIG. 7B shows that a road marking line which is not parallel to the traveling direction of the vehicle is removed. The parameter estimation unit 300 may generate a vanishing line by connecting a vanishing point decided through one stop line included in the extracted stop lines to the vanishing point of the calibrated straight line (the vanishing point v1' of the calibrated straight line decided during the process of estimating the pitches and yaws of the front and rear cameras), and calculate a rotation matrix of the front and rear cameras from the generated vanishing line according to Equation 8.

$$R_e = [r_1 - r_1 \times r_3 r_3]$$ [Equation 8]

In Equation 8, $R_e$ represents the rotation matrix of the front and rear cameras, $r_1$ represents the vanishing point of the calibrated straight line, which is decided during the process of estimating the pitches and yaws of the front and rear cameras, and $r_3$ represents the vanishing line.

When the rotation matrix of the cameras is calculated, the parameter estimation unit 300 may convert two straight lines included in the stop line into straight lines on the bird's-eye view according to Equation 9 below, and calculate a parallelism between the converted straight lines according to Equation 10 below.

$$L_{bv}' = (K \times R_e^T \times K_b^{-1})^{-T} \times L_{uv}$$ [Equation 9]

In Equation 9, $L_{uv}$ represents the stop line (that is, two straight lines included in the stop line, indicating straight lines of which lens distortions are calibrated according to Equation 2), and $L_{bv}'$ represents the converted straight lines on the bird's-eye view.

$$D_i = |d_i(1) - d_i(W)|$$ [Equation 10]

In Equation 10, $d_i(1)$ represents the width of an i-th stop line when the x-coordinate thereof is 1 in the bird's-eye view, and W represents the horizontal-axis resolution of the bird's-eye view.

When the value calculated through Equation 10 is equal to or less than a preset value, the parameter estimation unit 300 may determine that the parallelism between the two straight lines is high, and set the stop line including the straight lines to a stop line for reestimating the rolls of the front and rear cameras. When the number of set stop lines is equal to or more than a preset value, the parameter estimation unit 300 may reestimate the initially estimated rolls of the front and rear cameras within a preset angle range (for example, ±1°) through the LM according to Equation 11.

$$(R_\theta) = \arg\min_{R_\theta} \sum_i^N D_i$$ [Equation 11]

When the pitches, yaws and rolls of the front and rear cameras are estimated through the above-described process, the parameter estimation unit 300 may estimate yaws and rolls of the left and right cameras based on the direction of the left/right valid lanes and a vanishing point decided through the left/right valid lanes. The process of estimating the yaws and rolls of the left and right cameras may be performed in a similar manner to the process of estimating the pitches and yaws of the front and rear cameras. That is, the parameter estimation unit 300 may decide calibrated straight lines by calibrating lens distortion of the left/right valid lanes, initially estimate the yaws and rolls of the left and right cameras based on the relation between a vanishing point of the calibrated straight lines and a preset second reference vanishing point [1, 0, 0], and reestimate the yaws and rolls of the left and right cameras within a preset angle range, using the initially estimated yaws and rolls of the left and right cameras as the initial values. When reestimating the yaws and rolls of the left and right cameras, the parameter estimation unit 300 may convert the calibrated straight lines into the left/right valid lanes on the bird's-eye view, using the rotation matrix of the left and right cameras which is calculated through the reestimation process using the LM, and reestimate the yaws and rolls of the left and right cameras such that the converted left/right valid lanes are parallel to the second-direction reference axis (x-axis) on the bird's-eye view, and parallel to each other.

When the pitches, yaws and rolls of the front and rear cameras and the yaws and rolls of the left and right cameras are estimated, the parameter estimation unit 300 may estimate the pitches of the left and right cameras. Specifically, the parameter estimation unit 300 may estimate the pitches of the left and right cameras such that the same lanes among the lanes detected through the front, rear, left and right cameras are matched with each other. That is, the parameter estimation unit 300 may project the front/rear valid lanes and the left/right valid lanes onto a common coordinate system, and estimate the pitches of the left and right cameras such that the same lanes are matched with each other.

Specifically, as illustrated in FIG. 8, the parameter estimation unit 300 may sample the left/right valid lanes in which the yaws and rolls have been completely estimated through the RANSAC algorithm (a), estimate the pitches of the left and right cameras using the pitches as a model, under the supposition that a lane detected through the left and right cameras coincides with a lane detected through the front and rear cameras (b), and evaluate the lane fits of the pitches of the left and right cameras, estimated at (b), according to Equation 12 below (c).

$$P_\theta = \arg\max_{P_\theta} \left\{ \sum_i^N (th - |x_{si} - x_{fi}|) U(th - |x_{si} - x_{fi}|) + \sum_j^N (th - |x_{sj} - x_{rj}|) U(th - |x_{sj} - x_{rj}|) \right\}$$ [Equation 12]

In Equation 12, $x_{si}$ represents the x-coordinate of a side lane i (that is, the left/right valid lane) at the boundary between the side and front of the AVM system, and $x_{fi}$ represents the x-coordinate of a front lane i (that is, a front valid lane of the front/rear valid lanes) at the boundary between the side and front. Furthermore, $x_{sj}$ and $x_{rj}$ represent the x-coordinate of a side lane j at the boundary between the side and rear and the x-coordinate of a rear lane j (that is, a rear valid lane of the front/rear valid lanes). Furthermore, U represents a unit step function, and th represents a threshold pixel value (for example, five pixels).

When 12 installation angles including the pitches, yaws and rolls of the front, rear, left and right cameras are estimated through the above-described process, the parameter estimation unit 300 may precisely estimate the 12 installation angles through the LM. In this case, the parameter estimation unit 300 may estimate the pitches of the left and right cameras within an installation angle error range (for example, ±5°) of the left and right cameras using the pitches estimated through Equation 12 as the initial values, and reestimate the other 10 installation angles within a preset angle range (for example, ±1°) based on the angles estimated through Equations 6 and 7 (when no stop lines are detected) or Equation 11 (when a stop line is detected). The LM cost applied during the precise estimation process may include a condition C1 that the front/rear valid lanes are parallel to the y-axis and the left/right valid lanes are parallel to the x-axis, a condition C2 that the front/rear valid lanes and the left/right valid lanes are matched with each other, a condition C3 that a difference between the widths of the left and right lanes is minimized (when no stop lines are detected), and a condition C4 that two straight lines included in a stop line are parallel to each other (when the stop line is detected). The conditions have been applied during the process of estimating the pitches, yaws and rolls of the front, rear, left and right cameras, and may be expressed as Equation 13 below.

$$C = C_1 + C_2 + C_3 \text{ or } C_1 + C_2 + C_4 \quad \text{[Equation 13]}$$

$$C_1 = \sum_i^L |x_{fi}(1) - x_{fi}(H)| + \sum_j^L \sum_i^L \|x_{fi}(1) - x_{fi}(1)\|$$

$$- |x_{fi}(H) - x_{fi}(H)\| + \sum_i^M |x_{bi}(1) - x_{bi}(H)|$$

$$+ \sum_j^M \sum_i^M \|x_{bi}(1) - x_{bi}(1)\|$$

$$- |x_{bi}(H) - X_{bi}(H)\| + \sum_i^N |y_{li}(1) - y_{li}(W)|$$

$$+ \sum_j^N \sum_i^N \|y_{li}(1) - y_{li}(1)\|$$

$$- |y_{li}(W) - y_{li}(W)\| + \sum_i^O |y_{ri}(1) - y_{ri}(W)|$$

$$+ \sum_j^O \sum_i^O \|y_{ri}(1) - y_{ri}(1)\|$$

$$- |y_{ri}(W) - y_{ri}(W)\|$$

$$C_2 = \sum_i |x'_{fi} - x'_{li}| + \sum_i |x'_{bi} - x'_{li}| + \sum_i |x'_{fi} - x'_{ri}| +$$

$$\sum_i |x'_{bi} - x'_{ri}|$$

$$C_3 = \sum_i |w_{Lfi} - w_{Rfi}| + \sum_i |w_{Lbi} - w_{Rbi}|$$

$$C_4 = \sum_i |d_{fi}(1) - d_{fi}(W)| + \sum_i |d_{bi}(q) - d_{bi}(W)|$$

In $C_1$ of Equation 13, x and y represent the x- and y-coordinates of a point on a valid lane of the bird's-eye view, f, b, l and r represent the front, rear, left and right cameras, and H and W represent the height and width of the bird's-eye view. In $C_2$ of Equation 13, the first term represents the matching condition between the front valid lane and the left valid lane, the second term represents the matching condition between the rear valid lane and the left valid lane, the third term represents the matching condition between the front valid lane and the right valid lane, and the fourth term represents the matching condition between the rear valid lane and the right valid lane. For example, $x_{fi}'$ in the first term represents the x coordinate of the front valid lane at the boundary between the front and side on the common coordinate system in which four camera images are arranged. In $C_3$ of Equation 13, w represents the width of the road marking line, and L and R represent the left and right sides. In $C_4$ of Equation 13, $d_{fi}(1)$ represents the width of the i-th stop line when the x-coordinate is 1 in the bird's-eye view of the front camera. When the LM is performed at the cost of Equation 11, the installation angles of the left and right cameras may be precisely estimated to minimize the cost, while the installation angles of the front and rear cameras, which have been relatively precisely estimated before, are adjusted. Furthermore, the detected lanes may be precisely connected to each other and become parallel to the traveling direction of the vehicle, such that four camera images can be well arranged on the AVM coordinate system.

The calibration apparatus in accordance with the present embodiment may further include a parameter selection unit 400 which accumulates 12 installation angles as 12-dimensional vectors, the 12 installation angles including pitches, yaws and rolls estimated for the front, rear, left and right cameras. When the number of accumulated 12-dimensional vectors is equal to or more than a preset value, the parameter selection unit 400 may select a vector having the minimum average Euclidean distance among the 12-dimensional vectors as the final installation angle of the front, rear, left and right cameras.

In other words, the 12 installation angles which are precisely estimated through the above-described process may be used as the final system outputs. However, the parameter selection unit 400 in accordance with the present embodiment may store and accumulate the 12 installation angles as the 12-dimensional vectors in a queue, in order to raise the reliability of the process of estimating the 12 installation angles. When the number of accumulated 12-dimensional vectors is equal to or more than the preset value, the parameter selection unit 400 may select a vector having the minimum average Euclidean distance among the 12-dimensional vectors as the final installation angle.

In the present embodiment, the lane detection unit 100, the valid lane extraction unit 200, the parameter estimation unit 300 and the parameter selection unit 400 have been described as separate units. Depending on an embodiment, however, the units 100 to 400 may be integrated and implemented as one processor.

Figure 9:
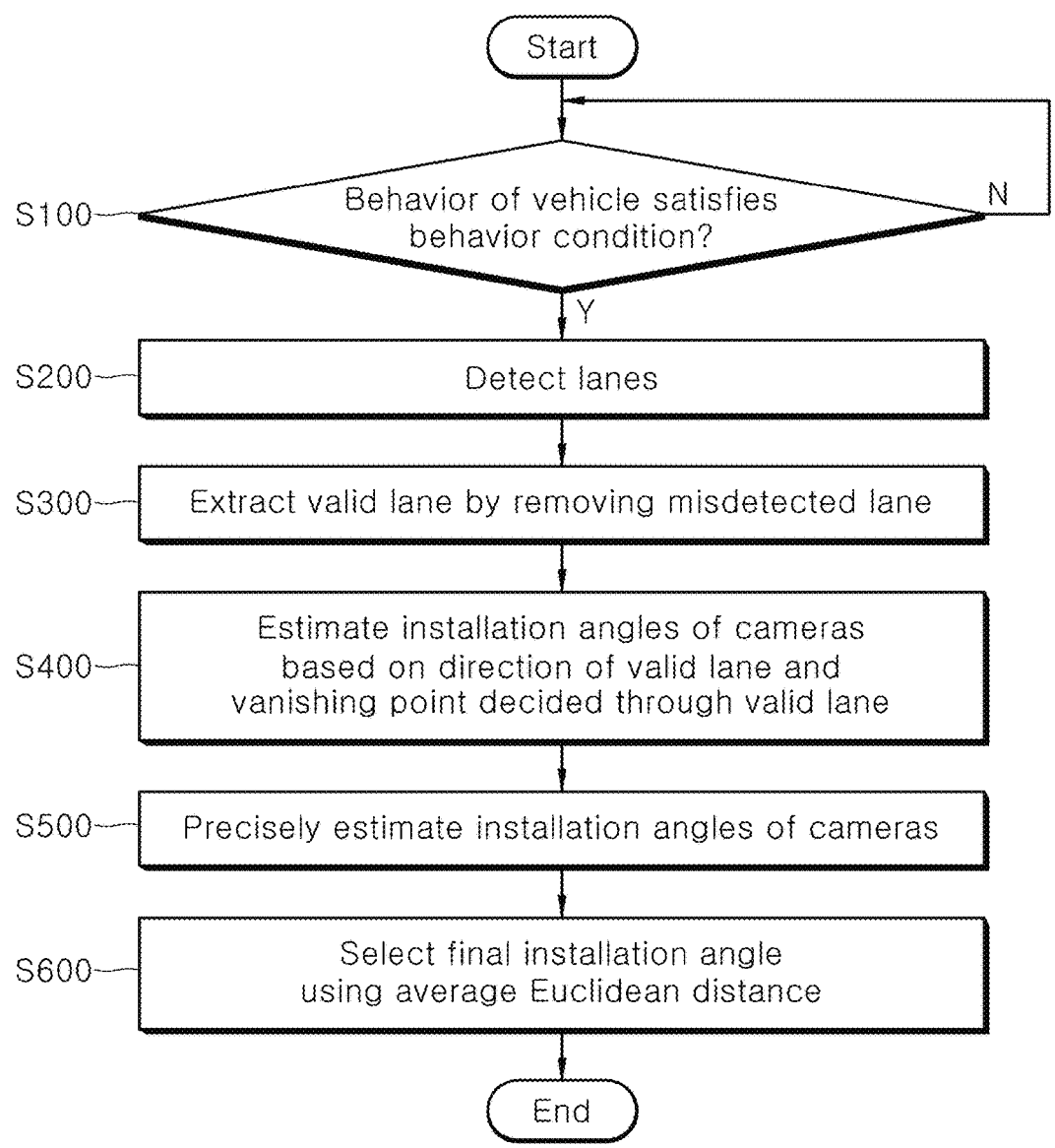
FIG. 9 is a flowchart illustrating a calibration method in accordance with an embodiment of the present invention.
Figure 10:
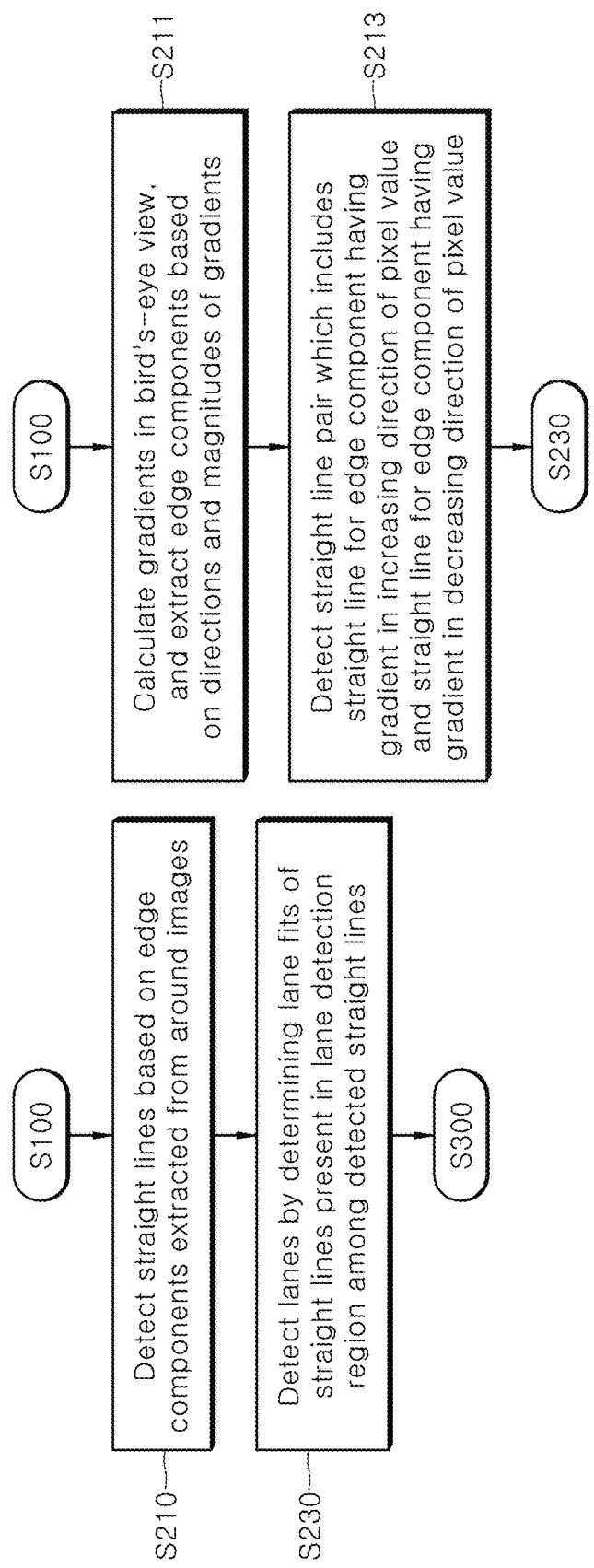
FIG. 10 is a flowchart illustrating a process in which the lane detection unit detects a lane in the calibration method in accordance with the embodiment of the present invention.
Figure 11:
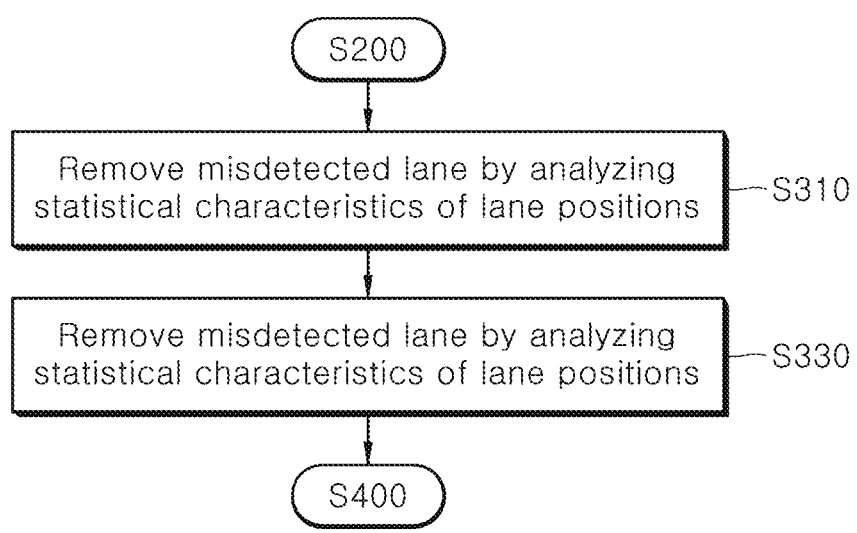
FIG. 11 is a flowchart illustrating a process in which the valid lane extraction unit extracts a valid lane in the calibration method in accordance with the embodiment of the present invention.
Figure 12:
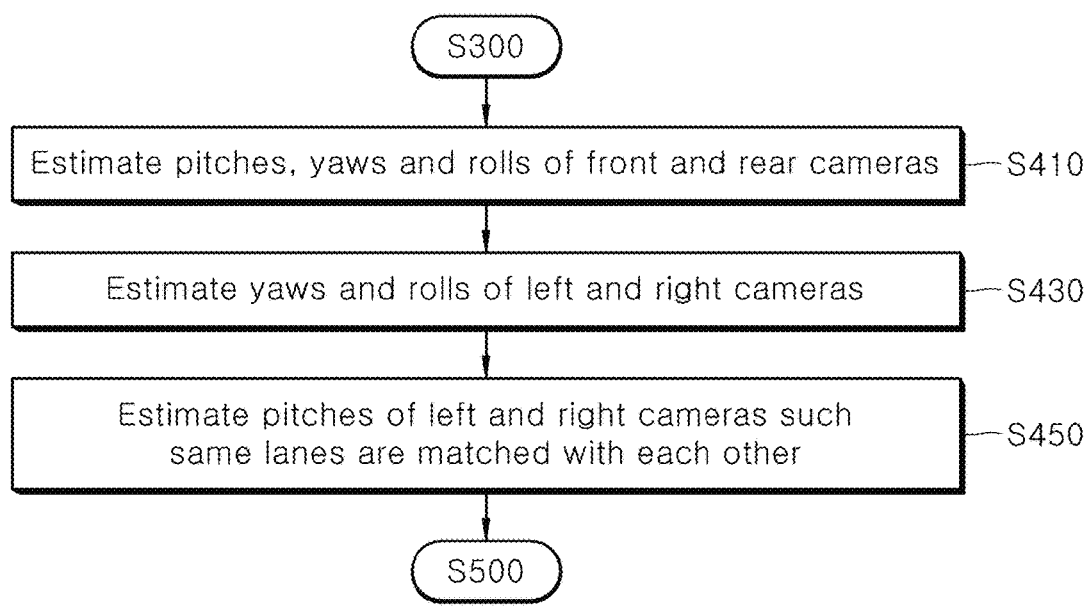
FIG. 12 is a flowchart illustrating a process in which the parameter estimation unit estimates installation angles of the cameras in the calibration method in accordance with the embodiment of the present invention.
Figure 13:
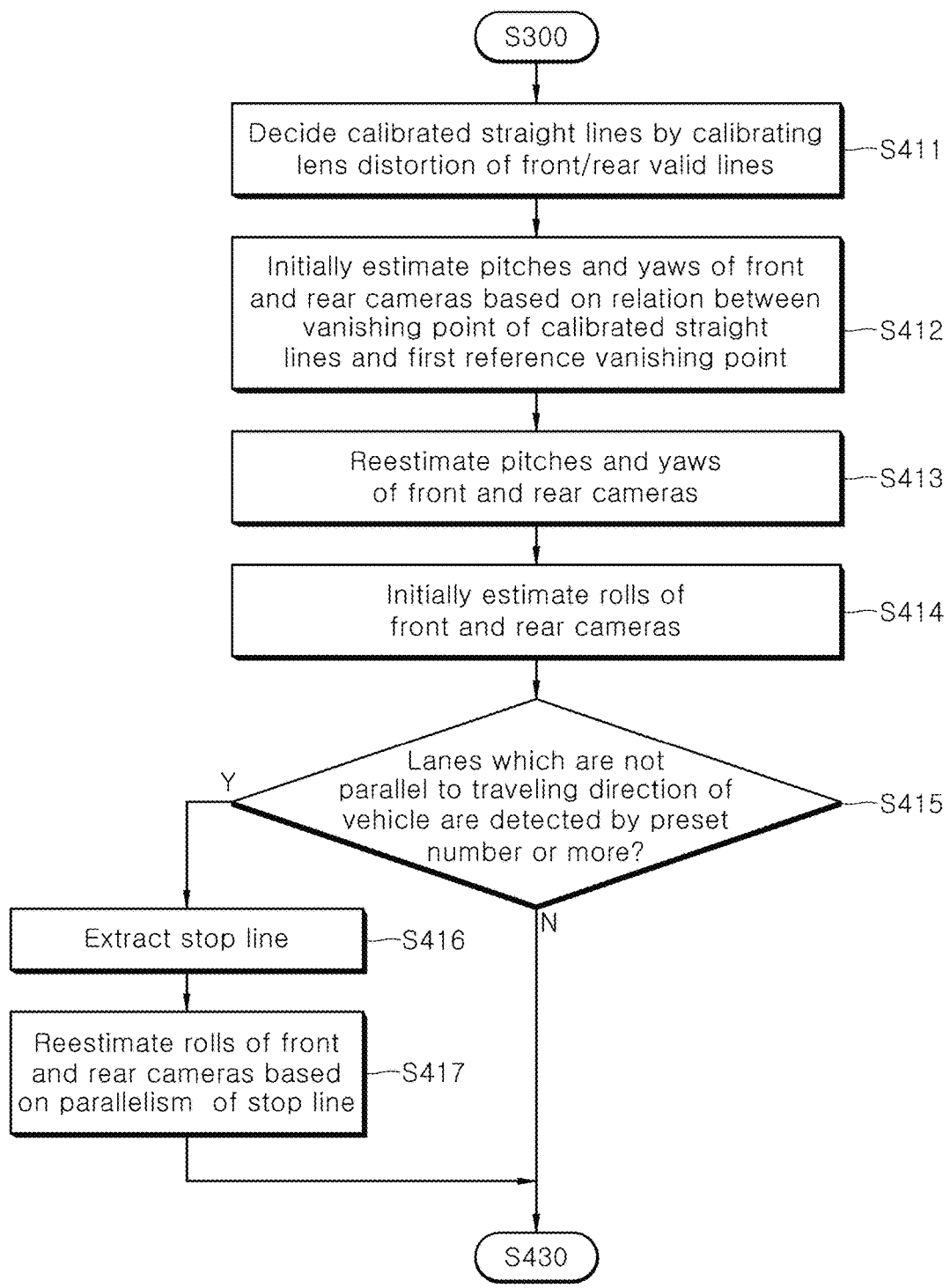
FIG. 13 is a flowchart illustrating a process in which the parameter estimation unit estimates pitches, yaws and rolls of the front and rear cameras in the calibration method in accordance with the embodiment of the present invention.
Figure 14:
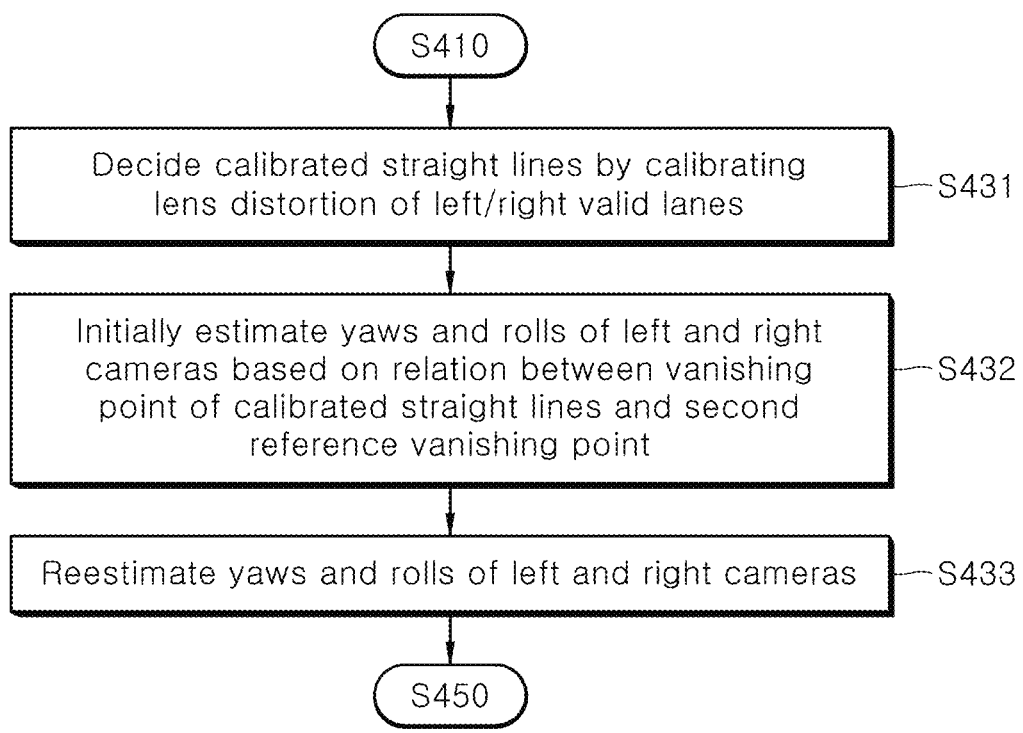
FIG. 14 is a flowchart illustrating a process in which the parameter estimation unit estimates yaws and rolls of the left and right cameras in the calibration method in accordance with the embodiment of the present invention.

FIG. 9 is a flowchart illustrating a calibration method in accordance with an embodiment of the present invention, FIG. 10 is a flowchart illustrating a process in which the lane detection unit detects a lane in the calibration method in accordance with the embodiment of the present invention, FIG. 11 is a flowchart illustrating a process in which the valid lane extraction unit extracts a valid lane in the calibration method in accordance with the embodiment of the present invention, FIG. 12 is a flowchart illustrating a process in which the parameter estimation unit estimates installation angles of the cameras in the calibration method in accordance with the embodiment of the present invention, FIG. 13 is a flowchart illustrating a process in which the parameter estimation unit estimates pitches, yaws and rolls of the front and rear cameras in the calibration method in accordance with the embodiment of the present invention, and FIG. 14 is a flowchart illustrating a process in which the parameter estimation unit estimates yaws and rolls of the left and right cameras in the calibration method in accordance with the embodiment of the present invention.

Hereafter, the calibration method in accordance with the embodiment of the present invention will be described with reference to FIGS. 9 to 14, and the duplicated descriptions of the above-described process will be omitted herein.

First, when a behavior of the vehicle satisfies a preset behavior condition at step S100, the lane detection unit 100 may detect lanes from around images acquired through the cameras of the vehicle at step S200. The behavior condition may include one or more of a vehicle speed condition for determining whether a vehicle speed is equal to or more than a preset vehicle speed and a steering angle condition for determining whether a steering angle is equal to or less than a preset steering angle.

Referring to FIG. 10, step S200 will be described in detail as follows. The lane detection unit 100 may detect straight lines based on edge components extracted from the around images acquired through the cameras, at step S210, and detect lanes by determining lane fits of straight lines present in the lane detection region of the ROI among the detected straight lines at step S230.

Step S210 will be described in more detail as follows. The lane detection unit 100 may calculate gradients in a bird's-eye view generated from the around images, and extract the edge components based on the directions and magnitudes of the calculated gradients, at step S211. At this time, the lane detection unit 100 may extract points at which angles between the reference axis of the bird's-eye view and the directions of the gradients calculated in the bird's-eye view fall within the lane angle change range of the ROI, and the magnitudes of the gradients are equal to or more than a preset threshold value of 75, for example, as the edge components.

In the case of a road marking line, the reference axis which is the comparison target with the directions of the gradients may be set to the y-axis in the bird's-eye views of the front and rear cameras or the x-axis in the bird's-eye views of the left and right cameras. In the case of a stop line, the reference axis may be set to the x-axis in the bird's-eye views of the front and rear cameras.

Then, the lane detection unit 100 may detect one or more straight line pairs, each of which includes a straight line for an edge component having a gradient in the increasing direction of pixel value and a straight line for an edge component having a gradient in the decreasing direction of pixel value, at step S213.

When the straight lines are detected through step S210, the lane detection unit 100 may decide straight lines which are present in the lane detection region of the ROI, among the straight lines detected through the above-described process, and determine the lane fits of the decided straight lines, thereby detecting lanes, at step S230. The lane fit may include one or more of a crossing condition, a lane thickness condition and an overlap ratio condition. Specifically, when one or more of the crossing condition, the lane thickness condition and the overlap ratio condition are satisfied, the lane detection unit 100 may determine that the straight line satisfies the lane fit. The crossing condition may indicate whether two straight lines included in the straight line pair detected through step S213 do not cross each other, the lane thickness condition may indicate whether the minimum distance and maximum distance between the two straight lines included in the straight line pair fall within the lane thickness change range of the ROI, and the overlap ratio condition may indicate whether the overlap ratio of the two straight lines included in the straight line pair when the two straight lines are projected onto the reference axis on the bird's-eye view is equal to or more than a preset ratio.

When the lanes are detected through step S200, the valid lane extraction unit 200 may analyze the statistical characteristics of the positions and directions of the detected lanes, and extract a valid lane by removing a misdetected lane, at step S300.

Referring to FIG. 11, step S300 will be described in detail as follows. The valid lane extraction unit 200 may project the positions of the lanes detected by the lane detection unit 100 onto the reference axis of the bird's-eye view generated from the around images, generate a histogram by accumulating a predetermined number of frames or more, determine a lane as a misdetected lane, the lane being a preset distance or more away from a reference lane position which is decided according to the generated histogram, and remove the misdetected lane, at step S310. That is, the lane detection unit 100 may analyze the statistical characteristics of the lane positions, in order to remove the misdetected lane.

Then, the valid lane extraction unit 200 may calculate the installation angles of the cameras using a vanishing point estimated through the lane detected by the lane detection unit 100, decide a calibrated lane by calibrating an angle error of a lane detected based on the calculation installation angle, determine a misdetected lane based on how parallel the decided calibrated lane and the reference axis on the bird's-eye view are to each other, and remove the misdetected lane, at step S330. That is, the lane detection unit 100 may analyze the statistical characteristics of the lane directions, and remove the misdetected lane.

When the valid lane is extracted through step S300, the parameter estimation unit 300 may estimate the installation angles of the cameras based on the direction of the valid lane and a vanishing point decided through the valid lane, at step S400. At this time, the parameter estimation unit 300 may estimate 12 installation angles including pitches, yaws and rolls of the front, rear, left and right cameras.

As illustrated in FIG. 12, step S400 may include step S410 of estimating the pitches, yaws and rolls of the front and rear cameras, step S430 of estimating the yaws and rolls of the left and right cameras, and step S450 of estimating the pitches of the left and right cameras.

Referring to FIG. 13, step S410 of estimating the pitches, yaws and rolls of the front and rear cameras will be described. First, the parameter estimation unit 300 may decide calibrated straight lines by calibrating lens distortion of front/rear valid lanes at step S411. The calibrated lines may be decided according to Equation 2 above.

Then, the parameter estimation unit 300 may initially estimate the pitches and yaws of the front and rear cameras based on the relation between a vanishing point of the calibrated straight lines and a preset first reference vanishing point, at step S412. Since the vanishing point of the calibrated lines meets a lane parallel to the traveling direction of the vehicle, the vanishing point needs to be positioned at a coordinate of [0, 1, 0] in the bird's-eye view. Therefore, the parameter estimation unit 300 may calculate a rotation matrix for converting the vanishing point of the calibrated straight lines into the first reference vanishing point according to Equations 3 and 4, in order to initially estimate the pitches and yaws of the front and rear cameras.

Then, the parameter estimation unit 300 may reestimate the pitches and yaws of the front and rear cameras within a preset angle range through the LM, using the initially estimated pitches and yaws of the front and rear cameras as the initial values, at step S413. At this time, the parameter estimation unit 300 may convert the calibrated straight lines into the front/rear valid lanes on the bird's-eye view, using the rotation matrix of the front and rear cameras which is calculated through the reestimation process using the LM algorithm, and reestimate the pitches and yaws of the front and rear cameras such that the front/rear valid lanes are parallel to the first-direction reference axis (y-axis) on the bird's-eye view, and parallel to each other.

In other words, the parameter estimation unit 300 may reestimate the pitches and yaws of the front and rear cameras within a preset angle range (for example, ±1°) through the LM, using the initially estimated pitches and yaws of the front and rear cameras as the initial values. Furthermore, the parameter estimation unit 300 may convert the calibrated straight lines into straight lines on the bird's-eye view according to Equation 5 above, using a camera rotation matrix calculated whenever the LM is repeated, and then calculate the cost of the LM according to Equation 6 above.

When the pitches and yaws of the front and rear cameras are reestimated, the parameter estimation unit 300 may initially estimate the rolls of the front and rear cameras, such that a difference between the widths of left and right lanes included in the front/rear valid lanes in the bird's-eye view, calibrated according to the reestimated pitches and yaws of the front and rear cameras, is minimized, at step S414. That is, when the pitches and yaws of the front and rear cameras are calibrated, the parameter estimation unit 300 may measure the width of the front/rear valid lanes because the front/rear valid lanes in the bird's-eye view become parallel to the y-axis as illustrated in FIG. 6, and estimate the rolls of the front and rear cameras based on the supposition that the widths of the left and right lanes included in the front/rear valid lanes are equal to each other. Therefore, the parameter estimation unit 300 may estimate the rolls of the front and rear cameras through the LM according to Equation 7 above, such that a difference between the widths of the left and right lanes is minimized.

The process of estimating the rolls of the front and rear cameras through step S414 did not consider a stop line. However, when a sufficient number of stop lines are detected while the vehicle travels, the parameter estimation unit 300 can estimate the rolls of the front and rear cameras with more precision, by utilizing the detected stop lines. That is, when a preset number of lanes or more which are not parallel to the traveling direction of the vehicle are detected at step S415, the parameter estimation unit 300 may extract stop lines from the lanes at step S416, and reestimate the initially estimated rolls of the front and rear cameras within a preset angle range through the LM, based on a parallelism between two straight lines included in the extracted stop lines, at step S417.

When the pitches, yaws and rolls of the front and rear cameras are estimated through step S410, the parameter estimation unit 300 may estimate the yaws and rolls of the left and right cameras at step S430.

Referring to FIG. 14, step S430 will be described in more detail as follows. First, the parameter estimation unit 300 may decide calibrated straight lines by calibrating lens distortion of the left/right valid lanes, at step S431.

Then, the parameter estimation unit 300 may initially estimate the yaws and rolls of the left and right cameras based on the relation between a vanishing point of the calibrated straight lines and a preset second reference vanishing point of [1, 0, 0], at step S432.

Then, the parameter estimation unit 300 may reestimate the yaws and rolls of the left and right cameras within a preset angle range through the LM, using the initially estimated yaws and rolls of the left and right cameras as the initial values, at step S433. The reestimation process of step S433 may be performed in a similar manner to the reestimation process of step S413. That is, the parameter estimation unit 300 may convert the calibrated straight lines into the left/right valid lanes on the bird's-eye view, using the rotation matrix of the left and right cameras which is calculated during the reestimation process using the LM, and reestimate the yaws and rolls of the left and right cameras such that the left/right valid lanes are parallel to the second-direction reference axis (x-axis) on the bird's-eye view, and parallel to each other.

When the pitches, yaws and rolls of the front and rear cameras and the yaws and rolls of the left and right cameras are estimated, the parameter estimation unit 300 may estimate the pitches of the left and right cameras. At this time, the parameter estimation unit 300 may estimate the pitches of the left and right cameras such that the same lanes among the lanes detected through the front, rear, left and right cameras are matched with each other. That is, the parameter estimation unit 300 may project the front/rear valid lanes and the left/right valid lanes onto the common coordinate system, and estimate the pitches of the left and right cameras such that the same lanes are matched with each other, at step S450.

When 12 installation angles including the pitches, yaws and rolls of the front, rear, left and right cameras are estimated through the above-described process, the parameter estimation unit 300 may precisely estimate the 12 installation angles through the LM at step S500. The LM cost applied during the precise estimation process may include a condition C1 that the front/rear valid lanes are parallel to the y-axis and the left/right valid lanes are parallel to the x-axis, a condition C2 that the front/rear valid lanes and the left/right valid lanes are matched with each other, a condition C3 that a difference between the widths of the left and right lanes is minimized (when no stop lines are detected), and a condition C4 that two straight lines included in a stop line are parallel to each other (when the stop line is detected). The conditions have been applied during the process of estimating the pitches, yaws and rolls of the front, rear, left and right cameras.

The 12 installation angles estimated through the above-described process can be used as final system outputs. In the present embodiment, the parameter selection unit 400 may accumulate 12 installation angles including the pitches, yaws and rolls estimated for the front, rear, left and right cameras as 12-dimensional vectors. When the number of accumulated 12-dimensional vectors is equal to or more than a preset value, the parameter selection unit 400 may select a vector having the minimum average Euclidean distance among the 12-dimensional vectors as the final installation angle of the front, rear and right cameras, at step S600. That is, the parameter selection unit 400 may store and accumulate the 12 installation angles as the 12-dimensional vectors in a queue, in order to raise the reliability of the process of estimating the 12 installation angles. When the number of accumulated 12-dimensional vectors is equal to or more than the preset value, the parameter selection unit 400 may select a vector having the minimum average Euclidean distance among the 12-dimensional vectors as the final installation angle.

The calibration apparatus and method in accordance with the present embodiments can perform calibration without a separate facility and a calibration site having a specific pattern drawn thereon, and remove temporal and spatial limits which have been accompanied during a calibration operation according to the related art, thereby improving a driver's convenience. Furthermore, once a driver drives a vehicle on the road without a special instruction, the external parameters of the cameras can be automatically calibrated, which makes it possible to improve the practicality of the calibration operation.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A calibration method comprising:
   detecting lanes from around images acquired through cameras of a vehicle, when a behavior of the vehicle satisfies a preset behavior condition;
   analyzing statistical characteristics of the positions and directions of the detected lanes, and extracting a valid lane by removing a misdetected lane; and
   estimating installation angles of the cameras based on the direction of the valid lane and a vanishing point decided through the valid lane.

2. The calibration method of claim 1, wherein the behavior condition comprises one or more of a vehicle speed condition that a vehicle speed is equal to or more than a preset vehicle speed and a steering angle condition that a steering angle is equal to or more than a preset steering angle.

3. The calibration method of claim 1, wherein the detecting of the lanes comprises:
   detecting straight lines based on edge components extracted from the around images; and
   detecting the lanes by determining lane fits of straight lines present in a preset lane detection region among the detected straight lines.

4. The calibration method of claim 3, wherein the detecting of the straight lines comprises:
   calculating gradients in a bird's-eye view generated from the around images, and extracting the edge components based on the directions and magnitudes of the calculated gradients; and
   detecting one or more straight line pairs, each of which includes a straight line for an edge component having a gradient in the increasing direction of pixel value and a straight line for an edge component having a gradient in the decreasing direction of pixel value, among the extracted edge components.

5. The calibration method of claim 4, wherein in the detecting of the lanes by determining the lane fits,
   it is determined that the lane fit is satisfied, when one or more of a crossing condition that two straight lines included in the straight line pair do not cross each other, a lane thickness condition that the minimum distance and maximum distance between the two straight lines included in the straight line pair fall within a preset lane thickness change range, and an overlap ratio condition that the overlap ratio of the two straight lines included in the straight line pair when the two straight lines are projected onto a reference axis on the bird's-eye view is equal to or more than a preset ratio are satisfied.

6. The calibration method of claim 1, wherein the extracting of the valid lane comprises:
   projecting the positions of the detected lanes onto a reference axis on a bird's-eye view generated through the around images, generating a histogram by accumulating a predetermined number of frames or more, determining a lane as a misdetected lane, the lane being a preset distance or more away from a reference lane position decided according to the generated histogram, and removing the misdetected lane; and
   calculating installation angles of the cameras using a vanishing point estimated through the detected lanes, deciding calculated lanes by calibrating angle errors of the detected lanes based on the calculated installation angles, deciding a misdetected lane based on parallelisms between the decided calibrated lanes and the reference axis on the bird's-eye view, and removing the misdetected lane.

7. The calibration method of claim 1, wherein the cameras comprise front, rear, left and right cameras, and the installation angles comprise a pitch, yaw and roll, and
   in the estimating of the installation angles of the cameras, 12 installation angles including pitches, yaws and rolls of the front, rear, left and right cameras are estimated.

8. The calibration method of claim 7, wherein the estimating of the installation angles of the cameras comprises:
   estimating the pitches, yaws and rolls of the front and rear cameras based on the directions of front/rear valid lanes and a vanishing point decided through the front/rear valid lanes, wherein the front/rear valid lanes are valid lanes on a bird's-eye view generated through the around images of the front and rear cameras;
   estimating the yaws and rolls of the left and right cameras based on the directions of left/right valid lanes and a vanishing point decided through the left/right valid lanes, wherein the left/right valid lanes are valid lanes on a bird's-eye view generated through the around images of the left and right cameras; and
   projecting the front/rear valid lanes and the left/right valid lanes onto a common coordinate system, and estimating the pitches of the left and right cameras such that the same lanes are matched with each other.

9. The calibration method of claim 8, wherein the estimating of the pitches, yaws and rolls of the front and rear cameras comprises:
   converting the front/rear valid lanes into calibrated straight lines on a coordinate system of which lens distortion is calibrated;
   estimating the pitches and yaws of the front and rear cameras based on the relation between a vanishing point decided through the calibrated straight lines and a preset first reference vanishing point;
   reestimating the pitches and yaws of the front and rear cameras within a preset angle range through the Levenberg-Marquardt (LM), using the initially estimated pitches and yaws of the front and rear cameras as the initial values; and
   initially estimating the rolls of the front and rear cameras, such that a difference between the widths of left and right lanes included in the front/rear valid lanes in the bird's-eye view, calibrated according to the reestimated pitches and yaws of the front and rear cameras, is minimized.

10. The calibration method of claim 9, wherein in the reestimating of the pitches and yaws of the front and rear cameras through the LM,
    the calibrated straight lines are converted into front/rear valid lanes on the bird's-eye view, using a rotation matrix of the front and rear cameras which is calculated during the reestimation process through the LM, and the pitches and yaws of the front and rear cameras are reestimated such that the front/rear valid lanes are parallel to a first-direction reference axis on the bird's-eye view, and parallel to each other.

11. The calibration method of claim 9, wherein the estimating of the pitches, yaws and rolls of the front and rear cameras further comprises extracting a stop line from lanes which are not parallel to a traveling direction of the vehicle, when the lanes which are not parallel to the traveling direction of the vehicle are detected by a preset number or more, and reestimating the initially estimated rolls of the front and rear cameras within a preset angle range through the LM, based on a parallelism between two straight lines included in the extracted stop line.

12. The calibration method of claim 8, wherein the estimating of the yaws and rolls of the left and right cameras comprises:
converting the left/right valid lanes into calibrated straight lines on the coordinate system of which lens distortion is calibrated;
initially estimating the yaws and rolls of the left and right cameras based on the relation between a vanishing point decided through the calibrated straight lines and a preset second reference vanishing point; and
reestimating the yaws and rolls of the left and right cameras within a preset angle range through the LM, using the initially estimated yaws and rolls of the left and right cameras as the initial values.

13. The calibration method of claim 8, further comprising precisely estimating 12 installation angles including the pitches, yaws and rolls estimated for the front, rear, left and right cameras through the LM.

14. The calibration method of claim 8, further comprising accumulating 12 installation angles including the pitches, yaws and rolls estimated for the front, rear, left and right cameras as 12-dimensional vectors, and selecting a vector having the minimum average Euclidean distance among the accumulated 12-dimensional vectors as the final installation angle of the front, rear, left and right cameras, when the number of accumulated 12-dimensional vectors is equal to or more than a preset value.

15. An apparatus comprising:
cameras configured to acquire around images; and
at least one processor configured to detect lanes from the around images acquired through the cameras of a vehicle, when a behavior of the vehicle satisfies a preset behavior condition;
the at least one processor configured to analyze statistical characteristics of the positions and directions of the detected lanes, and extract a valid lane by removing a misdetected lane; and
the at least one processor configured to estimate installation angles of the cameras based on the direction of the valid lane and a vanishing point decided through the valid lane.

16. The apparatus of claim 15, wherein the at least one processor detects straight lines based on edge components extracted from the around images, and determines lane fits of straight lines present in a preset lane detection region among the detected straight lines, in order to detect the lanes.

17. The apparatus of claim 16, wherein when detecting the straight lines based on the edge components, the at least one processor calculates gradients in a bird's-eye view generated from the around images, extracts the edge components based on the directions and magnitudes of the calculated gradients, and detects one or more straight line pairs, each of which includes a straight line for an edge component having a gradient in the increasing direction of pixel value and a straight line for an edge component having a gradient in the decreasing direction of pixel value, among the extracted edge components.

18. The apparatus of claim 17, wherein the at least one processor determines that the lane fit is satisfied, when one or more of a crossing condition that two straight lines included in the straight line pair do not cross each other, a lane thickness condition that the minimum distance and maximum distance between the two straight lines included in the straight line pair fall within a preset lane thickness change range, and an overlap ratio condition that the overlap ratio of the two straight lines included in the straight line pair when the two straight lines are projected onto a reference axis on the bird's-eye view is equal to or more than a preset ratio are satisfied.

19. The apparatus of claim 15, wherein the at least one processor projects the positions of the detected lanes onto a reference axis on a bird's-eye view generated from the around images, generates a histogram by accumulating a predetermined number of frames or more, determines a lane as a misdetected lane, the lane being a preset distance or more away from a reference lane position decided according to the generated histogram, and removes the misdetected lane,
wherein the at least one processor calculates installation angles of the cameras using a vanishing point estimated through the detected lanes, decides calibration lanes by calibrating angle errors of the detected lanes based on the calculated installation angles, decides a misdetected lane based on parallelisms between the decided calibrated lanes and the reference axis on the bird's-eye view, and removes the misdetected lane.

20. The apparatus of claim 15, wherein the cameras comprise front, rear, left and right cameras, and the installation angles comprise a pitch, yaw and roll, and
the at least one processor estimates 12 installation angles including pitches, yaws and rolls of the front, rear, left and right cameras.

21. The calibration apparatus of claim 20, wherein the at least one processor estimates the pitches, yaws and rolls of the front and rear cameras based on the directions of front/rear valid lanes and a vanishing point decided through the front/rear valid lanes, estimates the yaws and rolls of the left and right cameras based on the directions of left/right valid lanes and a vanishing point decided through the left/right valid lanes, projects the front/rear valid lanes and the left/right valid lanes onto a common coordinate system, and estimates the pitches of the left and right cameras such that the same lanes are matched with each other,
wherein the front/rear valid lane is a valid lane on a bird's-eye view generated from the around images of the front and rear cameras, and the left/right valid lane is a valid lane on a bird's-eye view generated from the around images of the left and right cameras.

22. The apparatus of claim 21, wherein the at least one processor converts the front/rear valid lanes into calibrated straight lines in the coordinate system of which lens distortion is calibrated, initially estimates the pitches and yaws of the front and rear cameras based on the relation between a vanishing point decided through the calibrated straight lines and a preset first reference vanishing point, reestimates the pitches and yaws of the front and rear cameras within a preset angle through the LM using the initially estimated pitches and yaws of the front and rear cameras as the initial values, and initially estimates the rolls of the front and rear cameras such that a difference between the widths of the left and right lanes included in the front/rear valid lanes in the bird's-eye view, calibrated according to the reestimated pitches and yaws of the front and rear cameras, is minimized.

23. The apparatus of claim 22, wherein when reestimating the pitches and yaws of the front and rear cameras, the at least one processor converts the calibrated straight lines into front/rear valid lanes on the bird's-eye view, using a rotation matrix of the front and rear cameras which is calculated during the reestimation process using the LM, and reestimates the pitches and yaws of the front and rear cameras such that the front/rear valid lanes are parallel to a first-direction reference axis on the bird's-eye view, and parallel to each other.

24. The apparatus of claim 22, wherein the at least one processor extracts a stop line from lanes which are not parallel to a traveling direction of the vehicle, when the lanes which are not parallel to the traveling direction of the vehicle are detected by a preset number or more, and reestimates the initially estimated rolls of the front and rear cameras within a preset angle range through the LM, based on a parallelism between two straight lines included in the extracted stop line.

25. The apparatus of claim 21, wherein the at least one processor converts the left/right valid lanes into calibrated straight lines on a coordinate system of which lens distortion is calibrated, initially estimates the yaws and rolls of the left and right cameras based on a vanishing point decided through the converted calibrated straight lines and a preset second reference vanishing point, and reestimates the yaws and rolls of the left and right cameras within a preset angle range through the LM, using the initially estimated yaws and rolls of the left and right cameras as the initial values.

26. The apparatus of claim 21, wherein the at least one processor precisely estimates 12 installation angles including the pitches, yaws and rolls estimated for the front, rear, left and right cameras through the LM.

27. The apparatus of claim 21, wherein the at least one processor is further configured to accumulate 12 installation angles including the pitches, yaws and rolls estimated for the front, rear, left and right cameras as 12-dimensional vectors, and select a vector having the minimum average Euclidean distance among the accumulated 12-dimensional vectors as the final installation angle of the front, rear, left and right cameras, when the number of accumulated 12-dimensional vectors is equal to or more than a preset value.

* * * * *